United States Patent [19]
Schilling

[11] Patent Number: 5,274,665
[45] Date of Patent: * Dec. 28, 1993

[54] POLYOPOLY OVERLAPPING SPREAD SPECTRUM COMMUNICATION SYSTEM AND METHOD

[75] Inventor: Donald L. Schilling, Sands Point, N.Y.

[73] Assignee: InterDigital Technology Corporation, Wilmington, Del.

[*] Notice: The portion of the term of this patent subsequent to Jul. 13, 2010 has been disclaimed.

[21] Appl. No.: 739,806

[22] Filed: Aug. 5, 1991

Related U.S. Application Data

[63] Continuation-in-part of Ser. No. 626,109, Dec. 14, 1990.

[51] Int. Cl.⁵ .............................................. H04K 1/00
[52] U.S. Cl. ............................................ 375/1; 380/34
[58] Field of Search .................. 375/1, 38, 48, 66, 89; 455/59, 103, 209, 216, 303; 380/33, 34, 40

[56] References Cited

U.S. PATENT DOCUMENTS

| | | |
|---|---|---|
| 3,731,198 | 5/1973 | Blasbalg .................. 375/1 |
| 3,831,013 | 8/1974 | Alsup et al. . |
| 3,900,721 | 8/1975 | Speiser et al. . |
| 4,112,372 | 9/1978 | Holmes et al. . |
| 4,222,115 | 9/1980 | Cooper et al. . |
| 4,238,850 | 12/1980 | Vance . |
| 4,247,942 | 1/1981 | Hauer . |
| 4,279,018 | 7/1981 | Carson .................. 375/1 |
| 4,392,232 | 7/1983 | Andren et al. . |
| 4,418,393 | 11/1983 | Zscheile, Jr. . |
| 4,418,425 | 11/1983 | Fennel, Jr. et al. . |
| 4,425,642 | 1/1984 | Moses et al. . |
| 4,455,651 | 6/1984 | Baran . |
| 4,479,226 | 10/1984 | Prabhu et al. . |
| 4,512,013 | 4/1985 | Nash et al. . |
| 4,523,311 | 6/1985 | Lee et al. . |
| 4,553,130 | 11/1985 | Kato . |
| 4,563,774 | 1/1986 | Gloge . |
| 4,606,039 | 8/1986 | Nicolas et al. . |
| 4,612,637 | 9/1986 | Davis et al. . |
| 4,621,365 | 11/1986 | Chiu . |
| 4,647,863 | 3/1987 | Skudera, Jr. et al. . |
| 4,649,549 | 3/1987 | Halpern et al. . |
| 4,653,069 | 3/1987 | Roeder . |
| 4,660,164 | 4/1987 | Leibowitz . |
| 4,672,605 | 6/1987 | Hustig et al. . |
| 4,672,629 | 6/1987 | Beier . |
| 4,672,658 | 6/1987 | Kavehrad et al. . |
| 4,675,839 | 6/1987 | Kerr . |
| 4,680,785 | 7/1987 | Akiyama et al. . |
| 4,691,326 | 9/1987 | Tsuchiya . |
| 4,697,260 | 9/1987 | Grauel et al. . |
| 4,703,474 | 10/1987 | Foschini et al. . |

(List continued on next page.)

*Primary Examiner*—Tod R. Swann
*Attorney, Agent, or Firm*—David Newman & Associates

[57] ABSTRACT

Two, three or more competitive personal communications network spread spectrum systems share spectrum without interfering with each other, without significantly decreasing the chip rate of each PCN system, and without increasing the level of interference seen by fixed service users. A duopoly of spread spectrum communications system includes a first transmitter station, a second transmitter station, a first receiver station and a second receiver station. A transmitter at the second transmitter station transmits a spread spectrum signal on a carrier frequency which is offset from the carrier frequency of the first transmitter at the transmitter station by the chip rate. A tripoly of spread spectrum communication system includes the elements of the duopoly spread spectrum system and further includes a third transmitter station and a third receiver station. A third transmitter at the third transmitter station transmits a spread spectrum signal on a carrier frequency which is offset from the first carrier frequency by twice the chip rate. The first, second and third receiver stations each have receivers which receive the respect of spread spectrum signals from the first, second and third transmitter stations. A polyopoly overlapping spread spectrum communications system may be used which allows many users to transmit and receive throughout the frequency regime.

29 Claims, 9 Drawing Sheets

U.S. PATENT DOCUMENTS

| | | |
|---|---|---|
| 4,707,839 | 11/1987 | Andren et al. . |
| 4,718,080 | 1/1988 | Serrano et al. . |
| 4,730,340 | 3/1988 | Frazier, Jr. . |
| 4,742,512 | 5/1988 | Akashi et al. . |
| 4,759,034 | 7/1988 | Nagazumi . |
| 4,789,983 | 12/1988 | Acampora et al. . |
| 4,799,253 | 1/1989 | Stern et al. . |
| 4,805,208 | 2/1989 | Schwartz . |
| 4,807,222 | 2/1989 | Amitay . |
| 4,837,802 | 6/1989 | Higashiyama et al. . |
| 4,850,036 | 7/1989 | Smith . |
| 4,860,307 | 8/1989 | Nakayama . |
| 4,866,732 | 9/1989 | Carey et al. . |
| 4,894,842 | 1/1990 | Broekhouen et al. . |
| 4,901,307 | 2/1990 | Gilhousen et al. . |
| 4,914,651 | 4/1990 | Lusignan . |
| 4,922,506 | 5/1990 | McCallister et al. . |
| 4,930,140 | 5/1990 | Cripps et al. . |
| 4,932,037 | 6/1990 | Simpson et al. . |
| 4,969,159 | 11/1990 | Belcher et al. . |
| 4,977,577 | 12/1990 | Arthur et al. . |
| 4,977,578 | 12/1990 | Ishigaki et al. . |
| 5,005,169 | 4/1991 | Bronder et al. . |
| 5,016,255 | 5/1991 | Dixon et al. . |
| 5,016,256 | 5/1991 | Stewart . |
| 5,022,047 | 6/1991 | Dixon et al. . |
| 5,023,887 | 6/1991 | Takeuchi et al. . |
| 5,029,181 | 7/1991 | Endo et al. . |
| 5,040,238 | 8/1991 | Comroe et al. . |
| 5,048,052 | 9/1991 | Hamatsu et al. . |
| 5,056,109 | 10/1991 | Gilhousen et al. . |
| 5,121,407 | 6/1992 | Partyka et al. .......................... 375/1 |

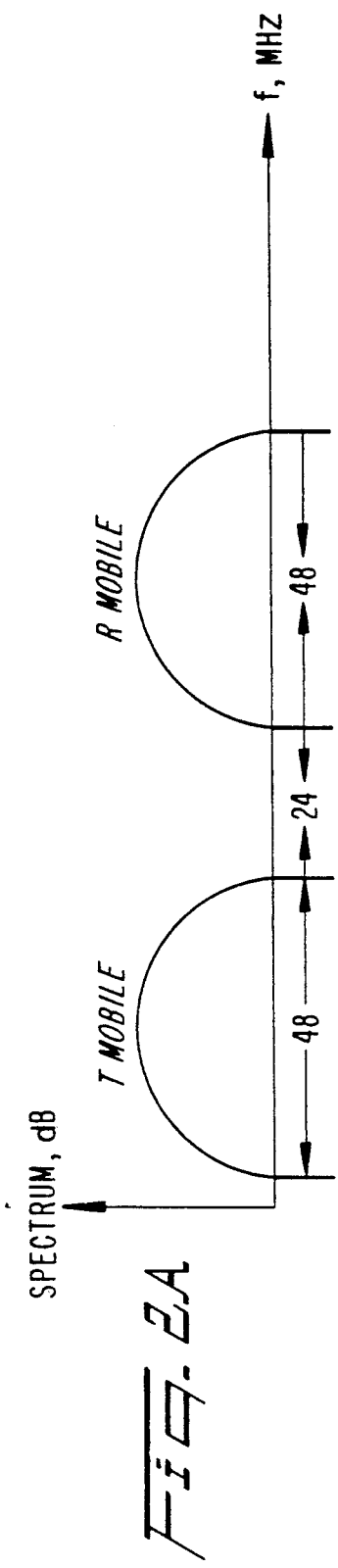
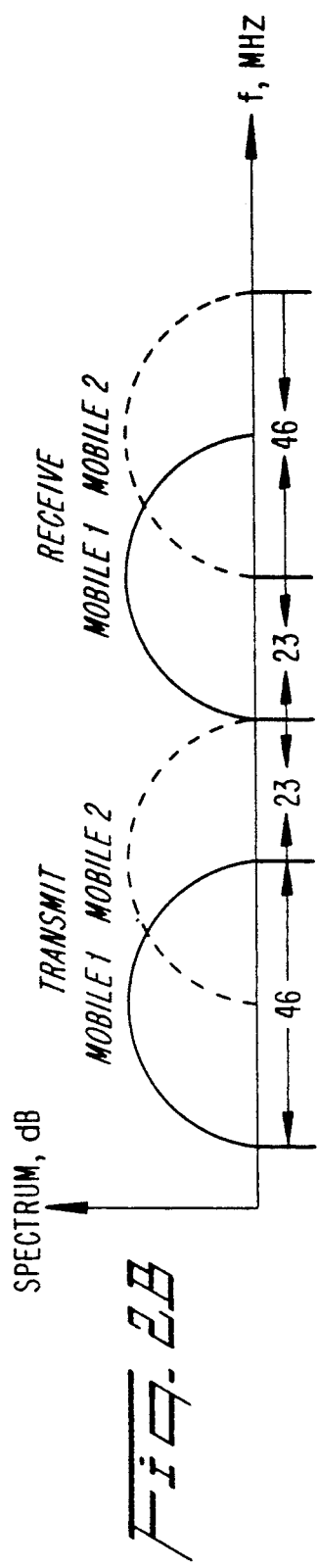
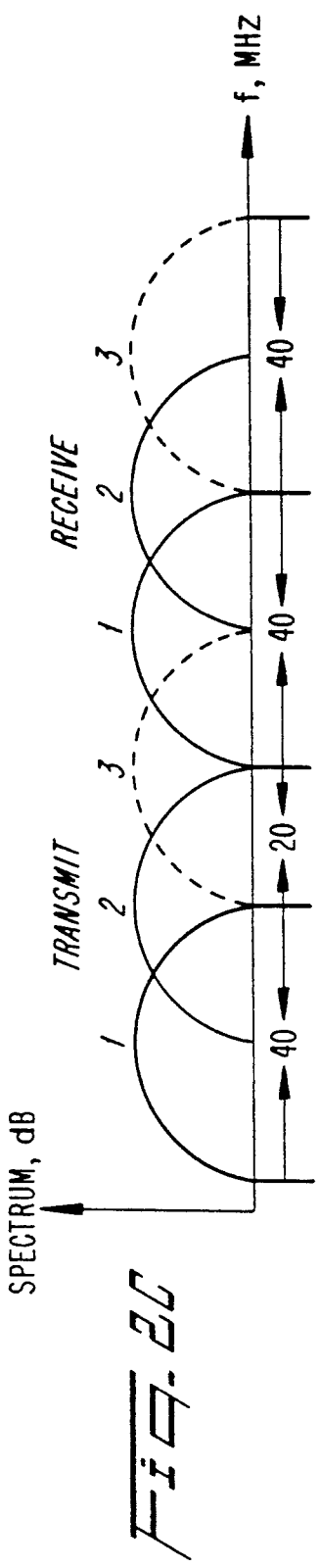

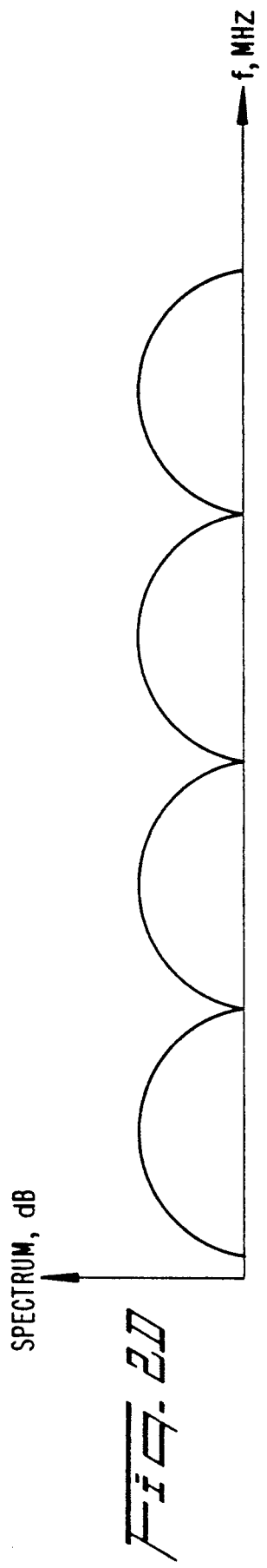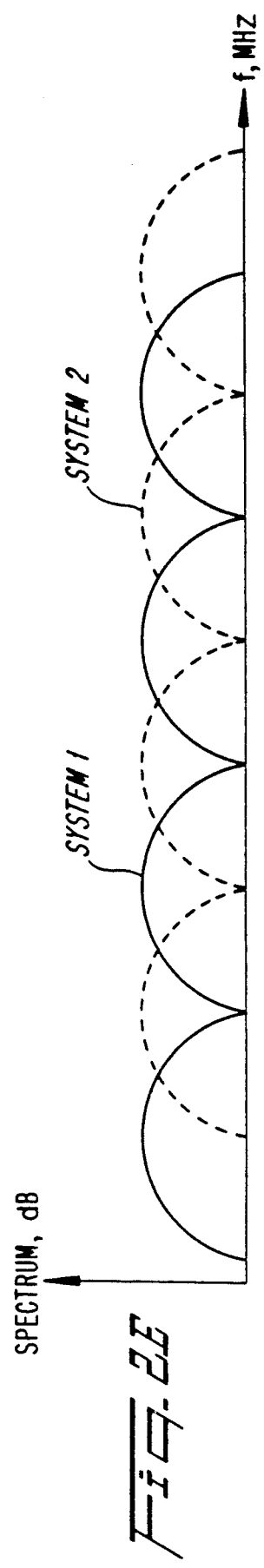

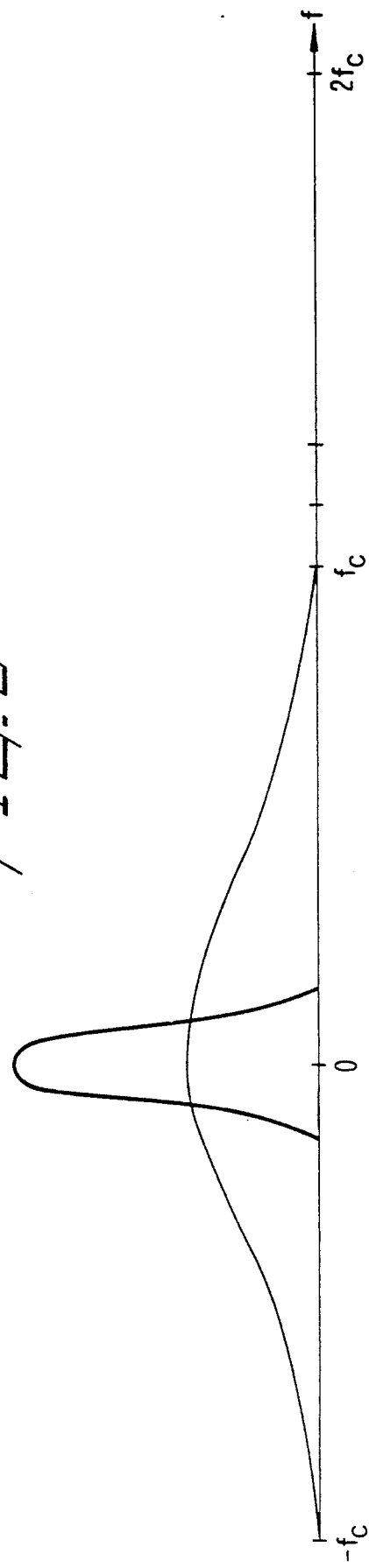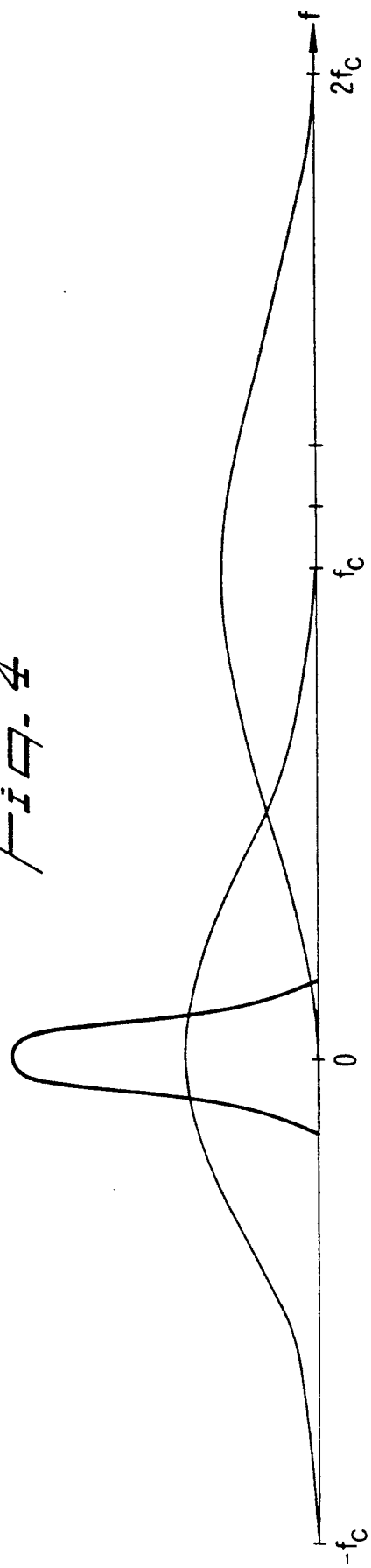

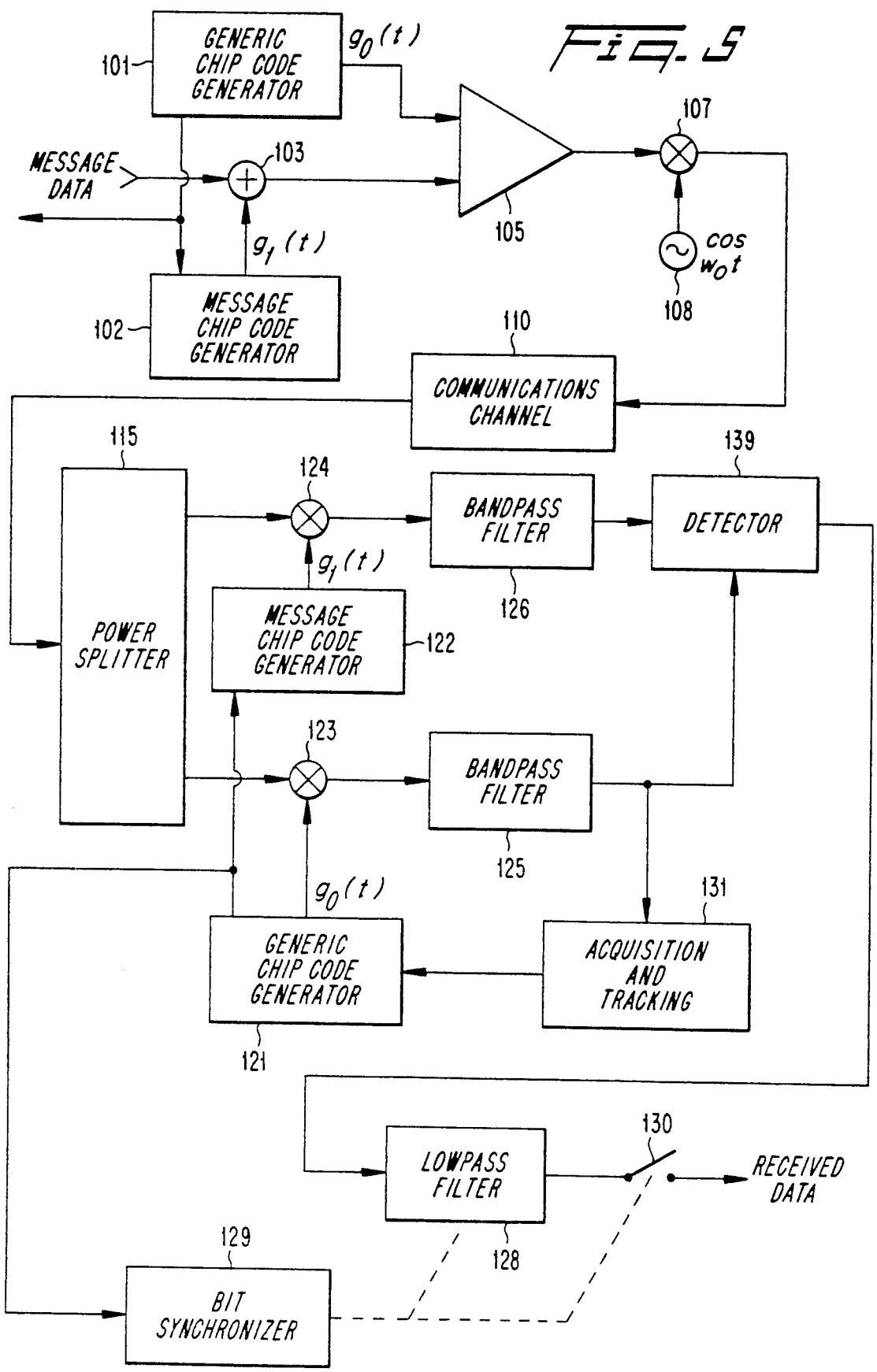

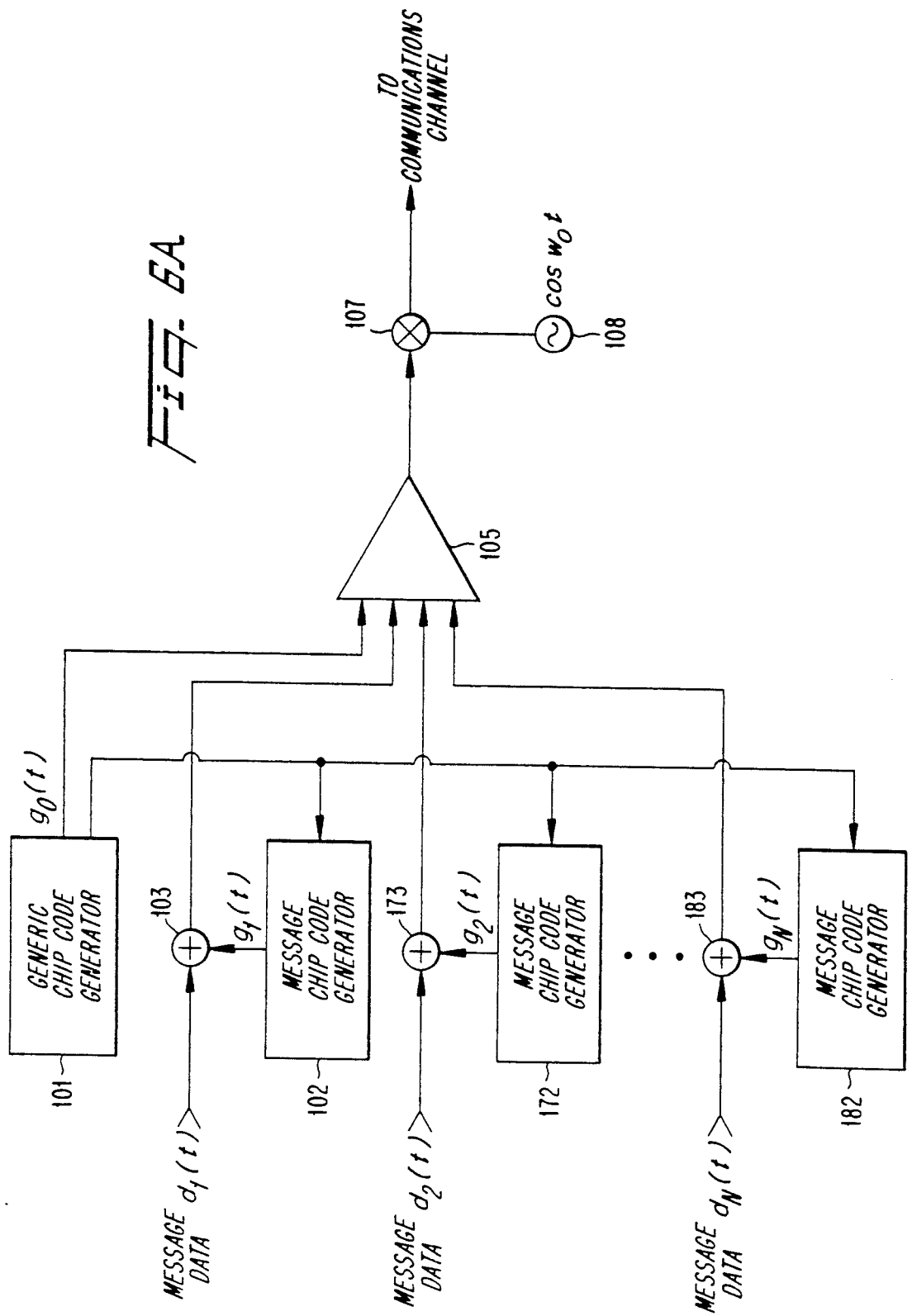

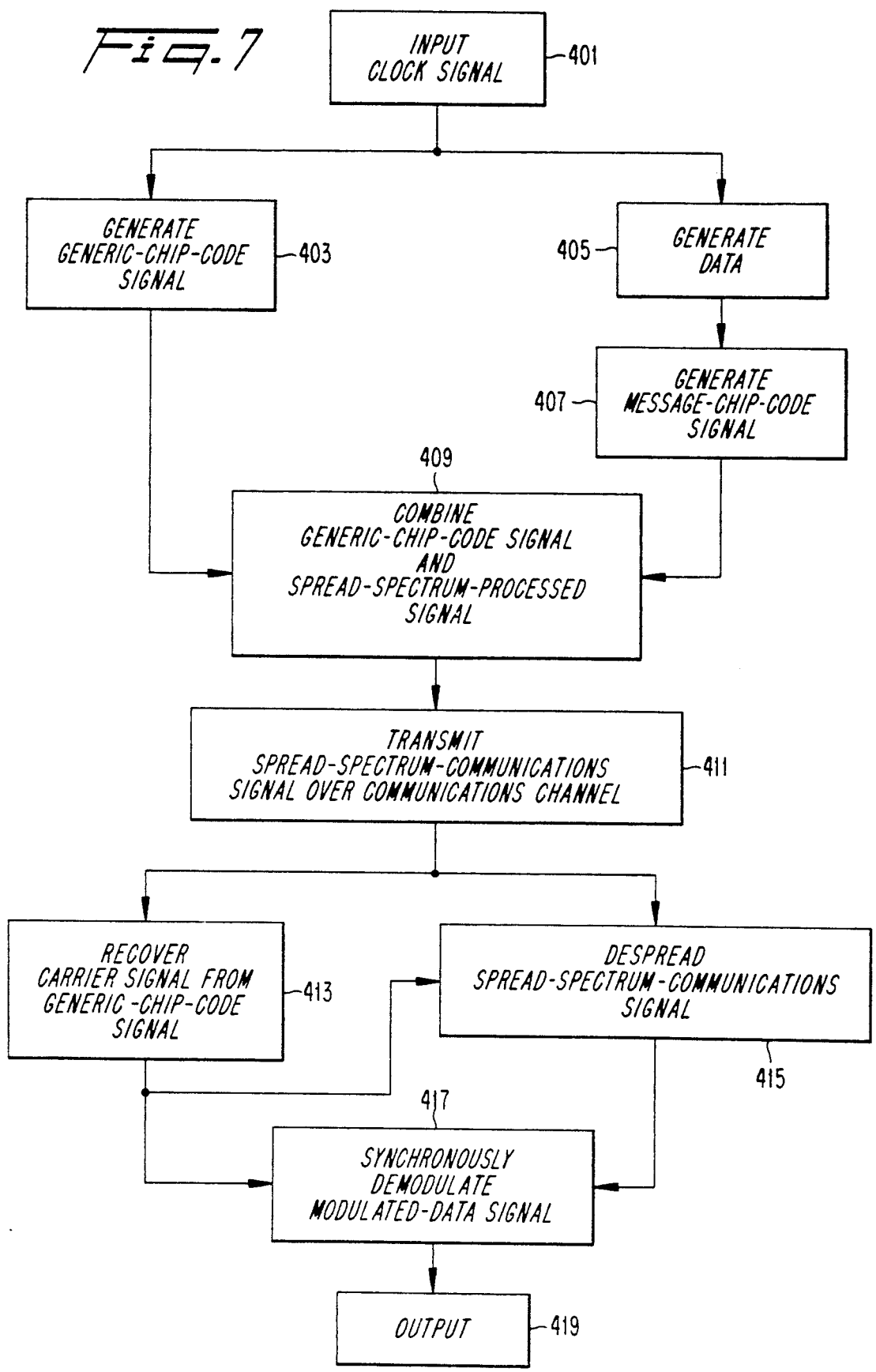

POLYOPOLY OVERLAPPING SPREAD SPECTRUM COMMUNICATION SYSTEM AND METHOD

This patent is a continuation-in-part of a patent application entitled, SYNCHRONOUS SPREAD-SPECTRUM COMMUNICATIONS SYSTEM AND METHOD, having Ser. No. 07/626,109, filing date of Dec. 14, 1990.

BACKGROUND OF THE INVENTION

This invention relates to spread-spectrum communications and more particularly to a system and method for simultaneously sharing frequency spectrum by two or more spread-spectrum systems in a allocated frequency band.

DESCRIPTION OF THE PRIOR ART

Referring to FIG. 1, message data, d(t), are processed by spread-spectrum data modulator 51, using a message-chip-code signal, $g_1(t)$, to generate a spread-spectrum data signal. The data spread-spectrum signal is processed by transmitter 52 using a carrier signal at a carrier frequency, $f_o$, and transmitted over communications channel 53.

At a receiver, a spread-spectrum demodulator 54 despreads the received spread-spectrum signal, and the message data are recovered by synchronous data demodulator 60 as received data. The synchronous data demodulator 60 uses a reference signal for synchronously demodulating the despread spread-spectrum signal. The square-law device 55, bandpass filter 56 and frequency divider 57 are well known in the art for generating a reference signal from a received modulated data signal. A Costas Loop or other reference signal generating circuit is also adequate.

Spread spectrum allows code division multiple access (CDMA) by having a plurality of users transmit and receive on the same carrier frequency, $f_o$, over the communications channel 53. In CDMA, each user is provided with an individual and distinctive chip codeword for generating a chip-code signal, respectively. The chip codewords typically are almost uncorrelated with one another. Since each user transmits on the same carrier frequency, the spectrum from each user overlaps. If there are multiple spread spectrum systems, they usually have frequency allocation with guard bands between the systems. While spread spectrum allows efficient use of spectrum, a need exists for a system and method which leaves virtually no spectrum unused.

OBJECTS OF THE INVENTION

A general object of the invention is a system and method for two or more spread-spectrum systems to share spectrum in an allocated frequency region without interfering with each other.

Another object of the invention is a system and method for two or more spread-spectrum systems to share spectrum in an allocated frequency region without significantly decreasing the chip rate, i.e., bandwidth, of each of the spread-spectrum systems.

An additional object of the invention is a system and method for two or more spread-spectrum systems to share spectrum in an allocated frequency region without significantly increasing interference to already existing fixed service users in the frequency region.

SUMMARY OF THE INVENTION

The present invention provides a system and method which allows two, three or more competitive or non-competitive personal communications network (PCN) spread spectrum systems to share spectrum without interfering with each other, without significantly decreasing the chip rate, i.e., bandwidth, of each PCN system, and without increasing the level of interference seen by fixed service users. The wide bandwidth is extremely important since the wider the bandwidth the more immune is the PCN system to fading due to multipath propagation.

Consider a duopoly spread spectrum communications system which comprises, at a minimum, a first transmitter station, a second transmitter station, a first receiver station and a second receiver station. The first transmitter station has first message means, first spreading means, first transmitter means, and the first receiver station has first message-spread-spectrum-processing means, first detection means, first bit-synchronization means. The second transmitter station has second message means, second spreading means and second transmitter means, and the second receiver station has second message-spread-spectrum-processing means, second detection means and second bit-synchronization means. First generic means is optional for generating a generic-chip-code signal. The first message means generates a first message-chip-code signal. The first spreading means generates a first spread-spectrum signal by spread-spectrum processing first message data with the first message-chip-code signal. The first message data and the first message-chip-code signal preferably have timing synchronized to the first generic-chip-code signal, if used, or to a common clock signal. The first summer means, if required, combines the first generic-chip-code signal with the first spread-spectrum-processed signal. The first transmitter means transmits the combined first generic-chip-code signal and first spread-spectrum-processed signal on a first carrier frequency, $f_o$, over the communications channel as a first spread-spectrum-communications signal.

Second generic means is optional for generating a second generic-chip-code signal. The second message means generates a second message-chip-code signal. The second generic-chip-code signal and the second message-chip-code signal have the same chip rate as the first generic-chip-code signal and the first message-chip-code signal. The chip rate is adjusted so that the combined bandwidth of the two competitive or non-competitive spread spectrum systems remains within an allocated bandwidth.

The second spreading means generates a second spread-spectrum signal by spread-spectrum processing second message data with the second message-chip-code signal. The second message data and the second message-chip-code signal preferably have timing synchronized to the second generic-chip-code signal, if used, or to a common clock signal. The second summer means, if required, combines the second generic-chip-code signal with the second spread-spectrum-processed signal. The second transmitter means transmits the combined second generic-chip-code signal and second spread-spectrum-processed signal on a second carrier frequency which is offset from the first carrier frequency by a frequency which is preferably equal to the chip rate, over the communications channel as a second spread-spectrum-communications signal. Any frequency offset greater than the chip rate would result in a decrease in efficiency in the use of the spectrum and any frequency offset less than the chip rate would result in an increase in interference between systems and to any other spread spectrum signal desiring to share the spectrum.

A triopoly spread spectrum communications system includes the elements of the duopoly spread spectrum system and further includes a third transmitter station and a third receiver station. The third transmitter station includes third message means, third spreading means, third transmitter means, and the third receiver station includes third message-spread-spectrum-processing means, third detection means and third bit-synchronization means. Third generic means is optional for generating a generic-chip-code signal. The third generic-chip-code signal and the third message-chip-code signal have the same chip rate as the first and second generic-chip-code signals and the first and second message-chip-code signals. Thi maximum value of the chip rate is adjusted for the triopoly so that the combined bandwidth of the three competitive or noncompetitive spread spectrum system remains within an allocated bandwidth. The third message means generates a third message-chip-code signal. The third spreading means generates a third spread-spectrum signal by spread-spectrum processing third message data with the third message-chip-code signal. The third message data and the third message-chip-code signal preferably have timing synchronized to the third generic-chip-code signal, if used, or to a common clock signal. The third summer means, if required. combines the third generic-chip-code signal with the third spread-spectrum-processed signal. The third transmitter means transmits the combined third generic-chip-code signal and third spread-spectrum-processed signal on a third carrier frequency which is offset from the first carrier frequency by twice the chip rate. over the communications channel as a third spread-spectrum-communications signal.

At the first receiver station, the first generic-spread-spectrum-processing means recovers the first carrier signal from the first spread-spectrum-communications signal. and the first message-spread-spectrum-processing means despreads the first spread-spectrum-communications signal as a first modulated-data signal. The first acquisition and tracking means tracks the first recovered-carrier signal for synchronizing the first generic-spread-spectrum-processing means to the first recovered-carrier signal. The first message-spread-spectrum-processing means derives synchronization from a replica of the first generic-chip-code signal provided by the first generic-spread-spectrum-processing means. The first detection means may be nonsynchronous or synchronous, for converting the modulated-data signal to a detected signal. The first bit-synchronization means uses the replica of the first generic-chip-code signal produced by the first generic-spread-spectrum-processing means for synchronizing the "integrating and dumping" of the first detected signal to first received data.

At the second receiver station, the second generic-spread-spectrum-processing means recovers the second carrier signal from the second spread-spectrum-communications signal, and the second message-spread-spectrum-processing means despreads the second spread-spectrum-communications signal as a second modulated-data signal. The second acquisition and tracking means tracks the second recovered-carrier signal for synchronizing the second generic-spread-spectrum-processing means to the second recovered-carrier signal. The second message-spread-spectrum-processing means derives synchronization from a replica of the second generic-chip-code signal provided by the second generic-spread-spectrum-processing means. The second detection means may be nonsynchronous or synchronous, for converting the modulated-data signal to a detected signal. The second bit-synchronization means uses the replica of the second generic-chip-code signal produced by the second generic-spread-spectrum-processing means for synchronizing the "integrating and dumping" of the second detected signal to second received data.

At the third receiver station, the third generic-spread-spectrum-processing means recovers the third carrier signal from the third spread-spectrum-communications signal, and the third message-spread-spectrum-processing means despreads the third spread-spectrum-communications signal as a third modulated-data signal. The third acquisition and tracking means tracks the third recovered-carrier signal for synchronizing the third generic-spread-spectrum-processing means to the third recovered-carrier signal. The third message-spread-spectrum-processing means derives synchronization from a replica of the third generic-chip-code signal provided by the third generic-spread-spectrum-processing means. The third detection means may be nonsynchronous or synchronous, for converting the modulated-data signal to a detected signal. The third bit-synchronization means uses the replica of the third generic-chip-code signal produced by the third generic-spread-spectrum-processing means for synchronizing the "integrating and dumping" of the third detected signal to third received data.

The present invention may be extended to handle a plurality of message data. Accordingly, the present invention further includes a first transmitter station, a second transmitter station and optionally a third, fourth or $N^{th}$ transmitter station, with each transmitter station having a plurality of message means and a plurality of spreading means. The plurality of message means generates a plurality of message chip-code signals. The plurality of message data and the plurality of message-chip-code signals all have synchronous timing derived from the generic-chip-code signal or to a common clock signal at each respective transmitter station. The plurality of spreading means generates a plurality of spread-spectrum signals by spread-spectrum processing the plurality of message data with the plurality of message-chip-code signals, respectively. The carrier signal of the second transmitter station is shifted in frequency from the carrier signal of the first transmitter station by the chip rate of the message-chip-code signals. The carrier signal of the third transmitter station is shifted in frequency from the carrier signal of the first transmitter station by twice the chip rate of the message-chip-code signals, etc.

Additionally, the present invention may be extended beyond a triopoly to a polyopoly of spread spectrum communications systems. The polyopoly of spread spectrum communications systems is an extension of the duopoly and triopoly, where each spread spectrum system is shifted in frequency progressively by the chip rate and the chip rate is adjusted so that the combined bandwidth of the multiplicity of spread spectrum systems remains within an allocated bandwidth.

The present invention also includes a first receiver station and a second receiver station for a duopoly, and for a triopoly a third receiver station with each receiver station for simultaneously receiving a spread-spectrum-communications signal having a plurality of spread-spectrum-processed signals. In this case, each receiver station further includes a plurality of message-spread-spectrum-processing means, a plurality of detection means and a plurality of bit-synchronization means. The acquisition and tracking means tracks the recovered-carrier signal for synchronizing the generic-spread-spectrum-processing means to the recovered-carrier signal. The carrier signal of the second transmitter station is shifted in frequency from the carrier signal of the first transmitter station by the chip rate of the message-chip-code signals. The carrier signal of the third transmitter station is shifted in frequency from the carrier signal of the first transmitter station by twice the chip rate of the message-chip-code signals. The plurality of message-spread-spectrum-processing means derive their synchronization from the replica of the generic-chip-code signal, from the generic-spread-spectrum-processing means. The plurality of message-spread-spectrum-processing means despreads the spread-spectrum-communications signal as a plurality of modulated-data signals, respectively. The plurality of detection means may be synchronous or nonsynchronous, for converting the plurality of modulated-data signals to a plurality of detected signals. The plurality of bit-synchronization means uses the replica of the generic-chip-code signal produced by the generic-spread-spectrum-processing means for synchronizing the detection of the plurality of detected signals to a plurality of received data.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 2A illustrates a monopoly spread spectrum system with users having a transmit bandwidth and a receiver bandwidth;

FIG. 2B illustrates a duopoly of spread spectrum systems;

FIG. 2C illustrates a triopoly of spread spectrum systems;

FIG. 2D shows a typical CMDA spread spectrum system with contiguous frequency allocations between sets of spread spectrum channels;

FIG. 2E illustrates the increase in capacity of a shared spread spectrum system compared with the spread spectrum system of FIG. 2D;

FIG. 3 illustrates two competitive or noncompetitive spread spectrum systems coexisting in a duopoly without inter-system interference;

FIG. 4 illustrates three competitive or noncompetitive spread spectrum systems coexisting in a triopoly without inter-system interference;

FIG. 5 shows a synchronous spread-spectrum system with a bit synchronizer, synchronized to a generic chip code generator according to the present invention;

FIG. 6A shows a synchronous spread spectrum transmitter system for a plurality of message data;

FIG. 7 shows a synchronous spread-spectrum demodulating method.

DETAILED DESCRIPTION OF THE PREFERRED EMBODIMENTS

Figure 1:
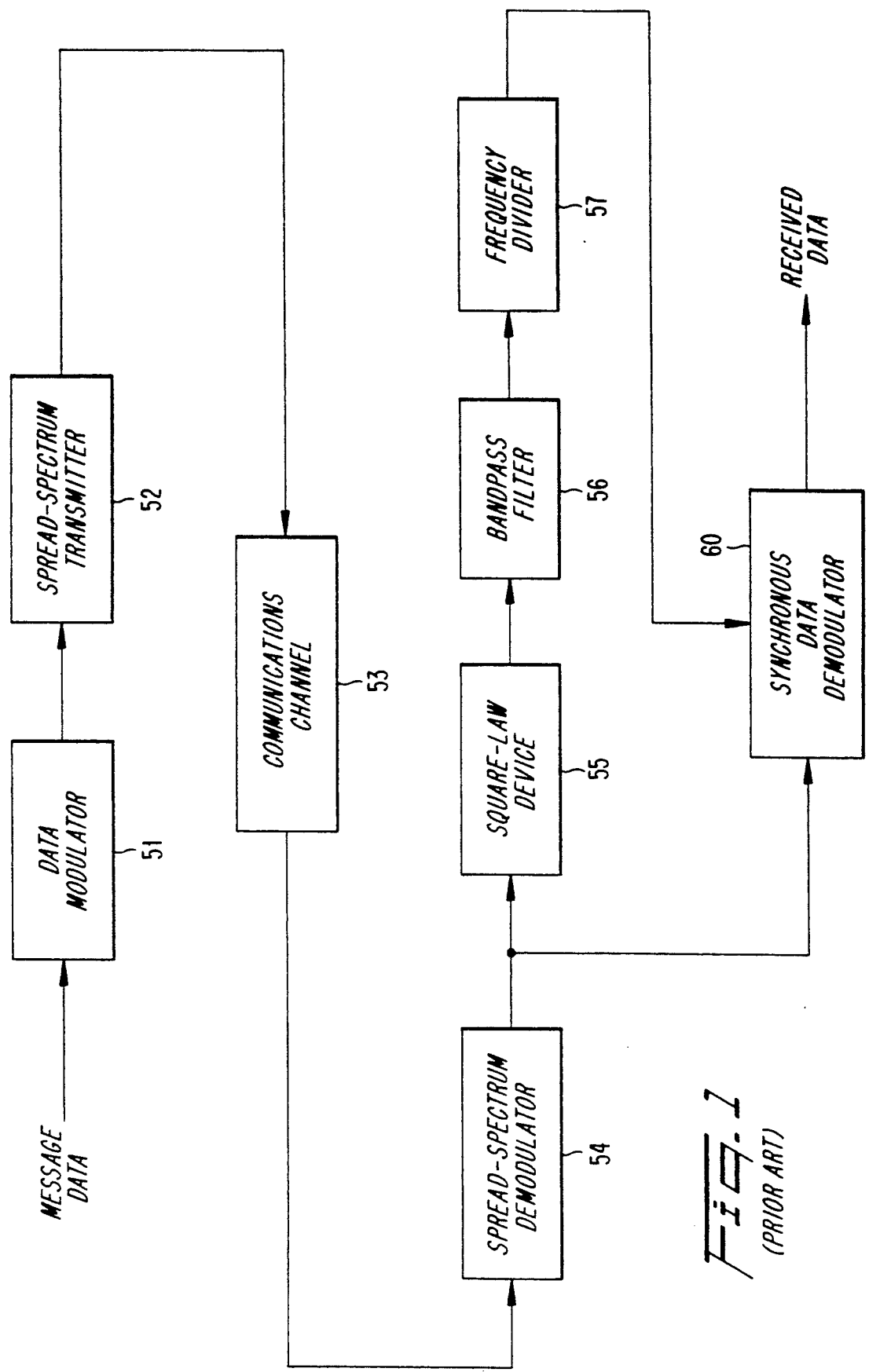
FIG. 1 is a prior art scheme for synchronously recovering message data.

Reference will now be made in detail to the present preferred embodiments of the invention, examples of which are illustrated in the accompanying drawings, wherein like reference numerals indicate like elements throughout the several views.

The present invention is for a system and method for generating spread-spectrum signals for competitive or noncompetitive spread-spectrum systems, which make efficient use of spectrum and do not interfere with each other. The present invention is taught for a duopoly by reference to a first transmitter station, a second transmitter station, a first receiver station and a second receiver station, and may be extended to a triopoly which includes a third transmitter station and a third receiver station, or more generally to a polyopoly which has multiple transmitter stations and multiple receiver stations. For the duopoly, the second carrier signal of the second transmitter station is shifted in frequency from the first carrier signal of the first transmitter station by a frequency which is equal to the chip rate of the message-chip-code signals. For the triopoly, the third carrier signal of the third transmitter station is shifted from the first carrier signal of the first transmitter station by a frequency which is equal to twice the chip rate of the message-chip-code signals. The first transmitter station, second transmitter station and the optional third transmitter station may be collocated or separately located. Similarly, the first receiver station, the second receiver station and the optional third receiver station may be collocated or separately located.

FIG. 2A shows the basic spectrum allocation employed for a single code division multiple access (CDMA) system, i.e., a monopoly, with a 140 MHz bandwidth. For the monopoly CDMA spread spectrum system, a first 48 MHz bandwidth is used for transmitting from a mobile user, and a second 48 MHz bandwidth is used for receiving at the mobile user. The first 48 MHz bandwidth is separated from the second 48 MHz bandwidth by a 24 MHz guard band. The remaining 20 MHz is used as guard band in this illustrative example. As more users are added to the monopoly CDMA spread spectrum system, the peak value of the sin(X)/X spectra increases. Thus, if 50 users are contemplated for a monopoly CDMA spread spectrum system, then the peak power value will double if 100 users use the system. The doubling of the peak power increases the interference by 3 dB to fixed service users who may already be using or sharing the spectrum. The fixed service users might be, for example, cellular users in the 800 MHz band or fixed service microwave users in the microwave band.

FIG. 2B shows that with a slight decrease in bandwidth, from 48 MHz to 46 MHz, two competitive or noncompetitive spread-spectrum systems can share a 140 MHz bandwidth without interfering with each other and without increasing the interference to the fixed-service users. The first 46 MHz bandwidth is used for transmitting from a first set of mobile users, and the second 46 MHz bandwidth which partially overlaps the first 46 MHz bandwidth is used for transmitting from a second set of mobile users. The third 46 MHz bandwidth is used for receiving at the first set of mobile users, and the fourth 46 MHz bandwidth which partially overlaps the third 46 MHz bandwidth is used for receiving at a second set of mobile users.

To illustrate that the two spread spectrum systems are noninterfering, consider the receiver in the base station for the second spread spectrum system and despread the spectra. FIG. 3 shows that as a result of the second spread spectrum system having a second carrier frequency shifted from the first carrier frequency by the chip rate, i.e. $f_c = 23$ MHz, there is only small interference between the systems. At the first receiver station of the first spread spectrum system, a first user is despread using a first chip-code signal $g_{11}(t)$. Thus, at an output of a first spread spectrum mixer, $$r_{11}(t) = \sqrt{2P_s}\left(\sum_{i=1}^{K} d_{i1}(t)g_{i1}(t)\cos(w_0 t)\right] +$$

$$\left(\sqrt{P_s}\left[\sum_{j=1}^{K} d_{j2}(t)g_{j2}(t)\cos((w_0 + w_c)t)\right]\right)\sqrt{2}\ g_{11}(t)\cos(w_0 t)$$

Hence.

$$r_{11}(t) = \sqrt{P_s}\left(d_{11}(t) + \sum_{i=2}^{K} d_{i2}(t)g_{i1}(t)g_{11}(t) + \sum_{j=1}^{K} d_{j2}(t)g_{j2}(t)\ g_{11}(t)\cos(w_c t)\right)$$

where: $d_{11}(t)$ are recovered data; the first summation includes, from the first spread spectrum CDMA system, the remaining signals which remain spread; the second summation includes, from the second spread spectrum system, all the signals which are spread and shifted by the chip rate, $f_c$; and, $w_c = 2\pi f_c$ and $w_o = 2\pi f_o$.

Each term of the foregoing equation is illustrated in FIG. 3. The signals 320 in the second spread spectrum CDMA system are offset from the signals 310 in the first spread spectrum CDMA system by the chip rate. The bandwidth of the signal $d_{11}(t)$ may be, for example, 32 kbps and can be recovered using a 16 kHz bandwidth matched filter, the extent of the overlap, i.e. the inner-symbol interference, is 16 kHz. Since the spectrum is near-zero between 0 and 16 kHz, the interference is small.

The reason that the transmit and receive bands of each system are spaced 23 MHz apart, i.e. a 23 MHz guard band, is to ensure that the transmitter power does not feed back into the receiver of the mobile handset. For a half-duplex system this is not necessary and the transmitter and receiver of each system can use the same bandwidth. Then, as FIG. 2B shows, twice as many systems can be used and $$(N+1)f_c = B$$

where B is the bandwidth, N is the number of systems, and $f_c$ is the chip rate. This equation can be written as $$N = (B/f_c) - 1.$$

In a full duplex mode, $$N = \tfrac{1}{2}\{B/f_c - 1\}.$$

FIG. 2C shows that the duopoly spread spectrum CDMA system can be extended to a triopoly spread spectrum CDMA system having three competitive or noncompetitive spread spectrum CDMA systems. In the triopoly, however, for an overall allocated bandwidth of 140 MHz, the bandwidth of each spread spectrum CDMA system must be reduced from 46 MHz, i.e. chip rate of 23 megachips per second, to 40 MHz, i.e. chip rate of 20 megachips per second, a 15 percent decrease in bandwidth. The three systems do not significantly interfere with each other, as shown in FIG. 4. Hence, their immunity to fading due to multipath is slightly reduced. In the triopoly, the first 40 MHz bandwidth is used for transmitting from a first set of mobile users, the second 40 MHz bandwidth which partially overlaps the first 40 MHz bandwidth is used for transmitting from a second set of mobile users, and the third 40 MHz bandwidth which partially overlaps the second 40 MHz bandwidth is used for transmitting from a third set of mobile users. The fourth 40 MHz bandwidth which partially overlaps the third 40 MHz bandwidth is used for receiving at the first set of mobile users, the fifth 40 MHz bandwidth which partially overlaps the fourth 40 MHz bandwidth is used for receiving at the second set of mobile users, and the sixth 40 MHz bandwidth which partially overlaps the fifth 40 MHz bandwidth is used for receiving at a third set of mobile users.

In the microwave band, fixed-service-microwave users see the spectrum of the various spread spectrum CDMA system shown in FIGS. 2B-2C. If each system has K users, one can readily show that the peak powers for FIG. 2A, FIG. 2B and FIG. 2C are the same. Hence the fixed-service-microwave user sees no increase in interference if a duopoly or triopoly is employed.

FIG. 2D shows a typical CMDA spread spectrum system with contiguous frequency allocations between sets of spread spectrum channels. The transmitter portion only is shown for this illustration. FIG. 2E illustrates the increase in capacity of a shared spread spectrum system using the spread spectrum overlay according to the present invention, compared with the spread spectrum system of FIG. 2D. With the overlay, the capacity of the system shown in FIG. 2E is double of that shown in FIG. 2D.

As illustratively shown in FIG. 5, a spread spectrum communications system for use over a communications channel 110 by the first transmitter station and the first receiver station, the second transmitter station and the second receiver station, and optionally, if used, by the third transmitter station and the third receiver station, or $N^{th}$ transmitter station and $N^{th}$ receiver station, is provided. The first transmitter station has first message means, first spreading means, first transmitter means, and the first receiver station has first message-spread-spectrum-processing means, first detection means, first bit-synchronization means. The second transmitter station has second message means, second spreading means and second transmitter means, and the second receiver station has second message-spread-spectrum-processing means, second detection means and second bit-synchronization means.

First generic means is optional for generating a generic-chip-code signal. The first message means generates a first message-chip-code signal. The first spreading means generates a first spread-spectrum signal by spread-spectrum processing first message data with the first message-chip-code signal. The first message data and the first message-chip-code signal preferably have timing synchronized to the first generic-chip-code signal, if used, or to a common clock signal. The first summer means, if required, combines the first generic-chip-code signal with the first spread-spectrum-processed signal. The first transmitter means transmits the combined first generic-chip-code signal and first spread-spectrum-processed signal on a first carrier frequency, $f_o$, over the communications channel as a first spread-spectrum-communications signal.

Second generic means is optional for generating a second generic-chip-code signal. The second message means generates a second message-chip-code signal. The second generic-chip-code signal and the second message-chip-code signal have the same chip rate as the first generic-chip-code signal and the first message-chip-code signal. The chip rate is adjusted so that the combined bandwidth of the two competitive or non-competitive spread spectrum systems remains within an allocated bandwidth.

The second spreading means generates a second spread-spectrum signal by spread-spectrum processing second message data with the second message-chip-code signal. The second message data and the second message-chip-code signal preferably have timing synchronized to the second generic-chip-code signal, if used, or to a common clock signal. The second summer means, if required, combines the second generic-chip-code signal with the second spread-spectrum-processed signal. The second transmitter means transmits the combined second generic-chip-code signal and second spread-spectrum-processed signal on a second carrier frequency which is offset from the first carrier frequency by a frequency which is preferably equal to the chip rate, over the communications channel as a second spread-spectrum-communications signal. Any frequency offset greater than the chip rate would result in a decrease in efficiency in the use of the spectrum and any frequency offset less than the chip rate would result in an increase in interference between systems and to any other non-spread spectrum signal desiring to share the spectrum.

A triopoly or polyopoly spread spectrum communications system includes at least the elements of the duopoly spread spectrum system and at least further includes a third transmitter station and a third receiver station. More transmitter stations and receiver stations may be required for polyopoly greater than a triopoly (3) spread spectrum systems. The third transmitter station includes third message means, third spreading means, third transmitter means, and the third receiver station includes third message-spread-spectrum-processing means, third detection means and third bit-synchronization means. Third generic means is optional for generating a generic-chip-code signal. The third generic-chip-code signal and the third message-chip-code signal have the same chip rate as the first and second generic-chip-code signals and the first and second message-chip-code signals. The chip rate is adjusted for the triopoly so that the combined bandwidth of the three competitive or noncompetitive spread spectrum systems remains within an allocated bandwidth. The adjustment should preferably be according to the following formula:

$$B = (2N+1)f_c$$

where B is the bandwidth, N is the number of systems, and $f_c$ is the chip rate.

The third message means generates a third message-chip-code signal. The third spreading means generates a third spread-spectrum signal by spread-spectrum processing third message data with the third message-chip-code signal. The third message data and the third message-chip-code signal preferably have timing synchronized to the third generic-chip-code signal, if used, or to a common clock signal. The third summer means, if required, combines the third generic-chip-code signal with the third spread-spectrum-processed signal. The third transmitter means transmits the combined third generic-chip-code signal and third spread-spectrum-processed signal on a third carrier frequency which is offset from the first carrier frequency by twice the chip rate, over the communications channel as a third spread-spectrum-communications signal.

For each transmitter station, as illustratively shown in FIG. 4, the generic means and message means may be embodied as a transmitter-generic-chip-code generator 101 and transmitter-message-chip-code generator 102. The spreading means is shown as an EXCLUSIVE-OR device 103, which may be an EXCLUSIVE-OR gate. Summer means is a combiner 105 and the transmitting means includes a transmitter which is embodied as a signal source 108 coupled to modulator 107. The transmitter-message-chip-code generator 102 is coupled to the EXCLUSIVE-OR device 103. The transmitter-generic-chip-code generator 101 is shown coupled to the transmitter-message-chip-code generator 102 and the source for message data. The EXCLUSIVE-OR device 103 and the transmitter-generic-chip-code generator 101 are coupled to the combiner 105. The modulator 107 is coupled between the combiner 105 and the communications channel 110. The carrier signal of the second transmitter station is shifted in frequency from the carrier signal of the first transmitter station by the chip rate of the message-chip-code signals. The carrier signal of the third transmitter station is shifted in frequency from the carrier signal of the first transmitter station by twice the chip rate of the message-chip-code signals.

At the first receiver station, the first generic-spread-spectrum-processing means recovers the first carrier signal from the first spread-spectrum-communications signal, and the first message-spread-spectrum-processing means despreads the first spread-spectrum-communications signal as a first modulated-data signal. The first acquisition and tracking means tracks the first recovered-carrier signal for synchronizing the first generic-spread-spectrum-processing means to the first recovered-carrier signal. The first message-spread-spectrum-processing means derives synchronization from a replica of the first generic-chip-code signal provided by the first generic-spread-spectrum-processing means. The first detection means may be nonsynchronous or synchronous, for converting the modulated-data signal to a detected signal. The first bit-synchronization means uses the replica of the first generic-chip-code signal produced by the first generic-spread-spectrum-processing means for synchronizing the "integrating and dumping" of the first detected signal to first received data.

At the second receiver station, the second generic-spread-spectrum-processing means recovers the second carrier signal from the second spread-spectrum-communications signal, and the second message-spread-spectrum-processing means despreads the second spread-spectrum-communications signal as a second modulated-data signal. The second acquisition and tracking means tracks the second recovered-carrier signal for synchronizing the second generic-spread-spectrum-processing means to the second recovered-carrier signal. The second message-spread-spectrum-processing means derives synchronization from a replica of the second generic-chip-code signal provided by the second generic-spread-spectrum-processing means. The second detection means may be nonsynchronous or synchronous, for converting the modulated-data signal to a detected signal. The second bit-synchronization means uses the replica of the second generic-chip-code signal produced by the second generic-spread-spectrum-processing means for synchronizing the "integrating and dumping" of the second detected signal to second received data.

At the third receiver station, the third generic-spread-spectrum-processing means recovers the third carrier signal from the third spread-spectrum-communications signal, and the third message-spread-spectrum-processing means despreads the third spread-spectrum-communications signal as a third modulated-data signal. The third acquisition and tracking means tracks the third recovered-carrier signal for synchronizing the third generic-spread-spectrum-processing means to the third recovered-carrier signal. The third message-spread-spectrum-processing means derives synchronization from a replica of the third generic-chip-code signal provided by the third generic-spread-spectrum-processing means. The third detection means may be nonsynchronous or synchronous, for converting the modulated-data signal to a detected signal. The third bit-synchronization means uses the replica of the third generic-chip-code signal produced by the third generic-spread-spectrum-processing means for synchronizing the "integrating and dumping" of the third detected signal to third received data.

At each receiver station, as shown in FIG. 5, the generic-spread-spectrum-processing means is embodied as the receiver-generic-chip-code generator 121, the generic mixer 123 and the generic-bandpass filter 125. The generic mixer 123 is coupled between the receiver-generic-chip-code generator 121 and the generic-bandpass filter 125. The message-spread-spectrum-processing means is embodied as a receiver-message-chip-code generator 122, a message mixer 124 and a message-bandpass filter 126. The message mixer 124 is coupled between the receiver-message-chip-code generator 122 and the message-bandpass filter 126. A power splitter 115 is coupled between the communications channel 110, and the generic mixer 123 and the message mixer 124.

The acquisition and tracking means is embodied as an acquisition and tracking circuit 131. The acquisition and tracking circuit 131 is coupled to an output of the generic-bandpass filter 125, and to the receiver-generic-chip-code generator 121. The receiver-message-chip-code generator 122 preferably is coupled to the receiver-generic-chip-code generator 121.

The detection means is embodied as a detector 139. The detector 139 is coupled to the message-bandpass filter 126 and the generic-bandpass filter 125. The detector 139 may be a nonsynchronous detector such as an envelope detector or square-law detector. Alternatively, the detector 139 may be a synchronous detector, which uses a recovered-carrier signal from the generic-bandpass filter 125.

The bit-synchronization means includes bit means, a lowpass filter 128 and electronic switch 130. The bit means is embodied as a bit synchronizer 129. The lowpass filter 128 and electronic switch 130 are coupled to the bit synchronizer 129. The bit synchronizer 129, as shown in FIG. 2, preferably is coupled to the receiver-generic-chip-code generator 121. Alternatively, the bit synchronizer 129 may be coupled to an output of the detector 139.

At each transmitter station the transmitter-generic-chip-code generator 101 generates a generic-chip-code code signal, $g_{i0}(t)$, and the transmitter-message-chip-code generator 102 generates a message-chip-code signal, $g_{i1}(t)$. The subscript reference i refers to the first transmitter station, the second transmitter station and the third transmitter station, for i=1, 2, 3, respectively. Synchronous timing of the message data, $d_{i1}(t)$, and the message-chip-code signal, in FIG. 5, at each transmitter station is provided by the generic-chip-code signal, although other sources can be used such as a common clock signal for synchronization. The EXCLUSIVE-OR device 103 generates a spread-spectrum signal by spread-spectrum processing message data with the message-chip-code signal. The spread-spectrum processing may be accomplished by modulo-2 adding the message data to the message-chip-code signal. The combiner 105 combines the generic-chip-code signal with the spread-spectrum-processed signal. The combined generic-chip-code signal and spread-spectrum-processed signal may be a multilevel signal, having the instantaneous voltage levels of the generic-chip-code signal and the spread-spectrum-processed signal.

At the first transmitter station, the modulator 107, as part of the transmitter, modulates the combined generic-chip-code signal and spread-spectrum-processed signal by a carrier signal, $\cos w_o t$, at a carrier frequency, $f_o$. At the second transmitter station the modulator 107, as part of the transmitter, modulates the combined second generic-chip-code signal and the second spread-spectrum-processed signal by a second carrier signal, $\cos (w_o + w_c)t$, at a second carrier frequency $f_o + f_c$. The second carrier frequency, $f_o + f_c$, is shifted from the first carrier frequency, $f_o$, by the chip rate, $f_c$, of the message-chip-code signals. At the third transmitter station the modulator 107, as part of the transmitter, modulates the combined third generic-chip-code signal and the third spread-spectrum-processed signal by a third carrier signal, $\cos (w_o + 2w_c)t$, at a third carrier frequency, $f_o + 2f_c$. The third carrier frequency, $f_o + 2f_c$, is shifted from the first carrier frequency, $f_o$, by twice the chip rate, $2f_c$, of the message chip code signals. The modulated generic-chip-code signal and spread-spectrum processed signal are transmitted over the communications channel 110 as a spread-spectrum-communications signal, $x_{c1}(t)$, $x_{c2}(t)$ and $x_{c3}(t)$. Thus, each spread-spectrum-communications signal includes the generic-chip-code signal and the spread-spectrum-processed signal as if they were each modulated separately, and synchronously, on separate carrier signals having the first carrier frequency, $f_o$, second carrier frequency, $f_o + f_c$, and third carrier frequency, $f_o+2f_c$, respectively, and transmitted over the communications channel.

At the first receiver station, the second receiver station and third receiver station, the first, second and third generic-spread-spectrum-processing means recovers the carrier signal, $\cos(w_o t)$, $\cos(w_o+w_c)t$ and $\cos(w_o+2w_c)t$ from the spread-spectrum-communications signal, $x_{c1}(t)$, $x_{c2}(t)$ and $x_{c3}(t)$, respectively and the first, second and third message-spread-spectrum-processing means despreads the first, second and third spread-spectrum-communications signals, $x_{c1}(t)$, $x_{c2}(t)$ and $x_{c3}(t)$, as a first, second and third modulated-data signal, $d_1(t)$, $d_2(t)$ and $d_3(t)$. More particularly, referring to FIG. 5, the first spread-spectrum-communications signal received from the communications channel 110, is divided by first power splitter 115. The first receiver-generic-chip-code generator 121 generates a replica of the first generic-chip-code signal, $g_{01}(t)$. The first generic mixer 123 uses the replica of the first generic-chip-code signal for despreading the first spread-spectrum-communications signal, $x_{c1}(t)$, from the first power splitter 115, as a first recovered-carrier signal. The spread-spectrum channel, of the spread-spectrum-communications signal having the first generic-chip-code signal, $g_{01}(t) \cos(w_o t)$, generally does not include data so that despreading the spread-spectrum-communications signal produces the carrier signal, only. The first generic-bandpass filter 125 filters the first recovered-carrier signal at the carrier frequency, or equivalently, at an IF. In comparison to the first message-bandpass filter 126 which has a bandwidth sufficiently wide for filtering a modulated-data signal, the first generic-bandpass filter 125 can have a very narrow bandwidth for filtering the first recovered-carrier signal. The very narrow bandwidth of the first generic-bandpass filter 125 assists in extracting the first recovered-carrier signal from noise.

The first acquisition and tracking circuit 131 acquires and tracks the first recovered-carrier signal from an output of the first generic-bandpass filter 125. The replica of the first generic-chip-code signal from the first receiver-generic-chip-code generator 121 is synchronized to the first recovered-carrier signal via first acquisition and tracking circuit 131.

The first receiver-message-chip-code generator 122 generates a replica of the first message-chip-code signal, $g_{11}(t)$. The replica of the first message-chip-code signal, $g_{11}(t)$, is synchronized to the first replica of the generic-chip-code signal, $g_{01}(t)$, from the first receiver-generic-chip-code generator 121. Thus, the first receiver-message-chip-code generator 122, via synchronization to the first receiver-generic-chip-code generator 121, has the same synchronization as the first transmitter-message-chip-code generator 102 via synchronization to the transmitter-generic-chip-code generator 101. Accordingly, the spread-spectrum communications channel having the first generic-chip-code signal provides coherent spread-spectrum demodulation of the spread-spectrum channels with data.

The first message mixer 124 uses the replica of the message-chip-code signal for despreading the first spread-spectrum-communications signal from the power splitter 115, to generate a first modulated-data signal, $d_{11}(t) \cos(w_o t)$. The first modulated-data signal effectively is the message data modulated by the first carrier signal. The first message-bandpass filter 126 filters the first modulated-data signal at the first carrier frequency, or equivalently at an intermediate frequency (IF). Down converters, which convert the first modulated-data signal to an IF, optionally may be used without altering the cooperative functions or teachings of the present invention.

The first detector 139 demodulates the first modulated-data signal as a first detected signal. The first detected signal is filtered through first lowpass filter 128, sampled by first electronic switch 130 and outputted as first received data, $d_{11}(t)$. The first received data, without errors, are identical to the first message data. The first lowpass filter 128 and first electronic switch 130 operate in an "integrate and dump" function, respectively, under the control of the first bit synchronizer 129.

The first bit synchronizer 129 controls the integrating and dumping of first lowpass filter 128 and first electronic switch 130. The first bit synchronizer 129 preferably derives synchronization using the replica of the first generic-chip-code signal from the first receiver-generic-chip-code generator 121 as illustrated in FIG. 5. The first bit synchronizer 129 also may derive synchronization from an output of the first detector 139, as illustrated in FIG. 1.

In a preferred embodiment, the first bit synchronizer 129 receives the first replica of the generic-chip-code signal, $g_{01}(t)$, from the first receiver-generic-chip-code generator 121. The replica of the first generic-chip-code signal, by way of example, may include a chip-code word having 8250 chips. Assuming that there are eleven bits per chip-code word, then there are 750 chips per bit of data. Since the replica of the generic-chip-code signal provides information to the bit synchronizer 129 as to where the chip-code word begins, the bit synchronizer 129 thereby knows the timing of the corresponding bits for synchronization.

The carrier signal of the second transmitter station is shifted in frequency from the carrier signal of the first transmitter station by the chip rate of the message-chip-code signals. The carrier signal of the third transmitter station is shifted in frequency from the carrier signal of the first transmitter station by twice the chip rate of the message-chip-code signals. The receivers of the second receiver station and the third receiver station can be the same as the receiver at the first receiver station, but adapted for the respective shift in carrier frequency.

The present invention may be extended to handle a plurality of message data. Accordingly, the present invention further includes a first transmitter station, a second transmitter station and optionally a third transmitter station, fourth transmitter station or $N^{th}$ transmitter station with each transmitter station having a plurality of message means and a plurality of spreading means. The plurality of message means generates a plurality of message chip-code signals. The plurality of message data and the plurality of message-chip-code signals all have synchronous timing derived from the generic-chip-code signal or to a common clock signal at each respective transmitter station. The plurality of spreading means generates a plurality of spread-spectrum signals by spread-spectrum processing the plurality of message data with the plurality of message-chip-code signals, respectively. The carrier signal of the second transmitter station is shifted in frequency from the carrier signal of the first transmitter station by the chip rate of the message-chip-code signals. The carrier signal of the third transmitter station is shifted in frequency from the carrier signal of the first transmitter station by twice the chip rate of the message-chip-code signals, etc.

The present invention further may include transmitting as each of the spread-spectrum-communications signals, a plurality of spread-spectrum-processed signals for handling a plurality of message data. In this case the invention includes a plurality of message means and a plurality of spreading means. Referring to FIG. 6A, the plurality of message means may be embodied as a plurality of transmitter-message-chip-code generators and the plurality of spreading means may be embodied as a plurality of EXCLUSIVE-OR gates. The plurality of transmitter-message-chip-code generators generates a plurality of message-chip-code signals. In FIG. 6A, the plurality of transmitter-message-chip-code generators is shown as first transmitter-message-chip-code generator 102 generating first message-chip-code signal, $g_1(t)$, second transmitter-message-chip-code generator 172 generating second message-chip-code signal, $g_2(t)$, through $N^{th}$ transmitter-message-chip-code generator 182 generating $N^{th}$ message-chip-code signal, $g_N(t)$. The plurality of EXCLUSIVE-OR gates is shown as first EXCLUSIVE-OR gate 103, second EXCLUSIVE-OR gate 173, through $N^{th}$ EXCLUSIVE-OR gate 183. The plurality of EXCLUSIVE-OR gates generates a plurality of spread-spectrum-processed signals by modulo-2 adding the plurality of message data $d_1(t), d_2(t), \ldots, d_N(t)$ with the plurality of message-chip-code signals $g_1(t), g_2(t), \ldots, g_N(t)$, respectively. More particularly, the first message data, $d_1(t)$, are modulo-2 added with the first message-chip-code signal, $g_1(t)$, the second message data, $d_2(t)$, are modulo-2 added with the second message-chip-code signal, $g_2(t)$, through the $N^{th}$ message data, $d_N(t)$, which are modulo-2 added with the $N^{th}$ message-chip-code signal, $g_N(t)$.

The transmitter-generic-chip-code generator 101 is coupled to the plurality of transmitter-message-chip-code generators and the source for the plurality of message data, $d_1(t), d_2(t), \ldots, d_N(t)$. The generic-chip-code signal $g_0(t)$, in a preferred embodiment, provides synchronous timing for the plurality of message-chip-code signals $g_1(t), g_2(t), \ldots, g_N(t)$, and the plurality of message data $d_1(t), d_2(t), \ldots, d_N(t)$.

The combiner 105 combines the generic-chip-code signal and the plurality of spread-spectrum-processed signals, by linearly adding the generic-chip-code signal with the plurality of spread-spectrum-processed signals. The combined signal typically is a multilevel signal, which has the instantaneous voltage levels of the generic-chip-code signal and the plurality of spread-spectrum-processed signals.

The modulator 107, as part of the transmitter, modulates the combined generic-chip-code signal and the plurality of spread-spectrum-processed signals by a carrier signal, $\cos w_0 t$, at a carrier frequency, $f_0$. The modulated generic-chip-code signal and the plurality of spread-spectrum processed signals are transmitted over the communications channel 110 as a spread-spectrum-communications signal, $x_c(t)$. The spread-spectrum-communications signal, $x_c(t)$ has the form:

$$x_c(t) = \left( g_0(t) + \sum_{i=1}^{K} [g_i(t) + d_i(t)] \right) \cos w_0 t$$

Thus, the spread-spectrum-communications signal includes the generic-chip-code signal and the plurality of spread-spectrum-processed signals as if they were each modulated separately, and synchronously, on separate carrier signals with the same carrier frequency, $f_0$, and transmitted over the communications channel.

The present invention also includes a first receiver station and a second receiver station for a duopoly, and for a triopoly a third receiver station with each receiver station for simultaneously receiving a spread-spectrum-communications signal having a plurality of spread-spectrum-processed signals. In this case, each receiver station further includes a plurality of message-spread-spectrum-processing means, a plurality of detection means and a plurality of bit synchronization means. The acquisition and tracking means tracks the recovered-carrier signal for synchronizing the generic-spread-spectrum-processing means to the recovered-carrier signal. The carrier signal of the second transmitter station is shifted in frequency from the carrier signal of the first transmitter station by the chip rate of the message-chip-code signals. The carrier signal of the third transmitter station is shifted in frequency from the carrier signal of the first transmitter station by twice the chip rate of the message-chip-code signals. The plurality of message-spread-spectrum-processing means derive their synchronization from the replica of the generic-chip-code signal, from the generic-spread-spectrum-processing means. The plurality of message-spread-spectrum-processing means despreads the spread-spectrum-communications signal as a plurality of modulated-data signals, respectively. The plurality of detection means may be synchronous or nonsynchronous, for converting the plurality of modulated-data signals to a plurality of detected signals. The plurality of bit synchronization means uses the replica of the generic-chip-code signal produced by the generic-spread-spectrum-processing means for synchronizing the detection of the plurality of detected signals to a plurality of received data.

Figure 6B:
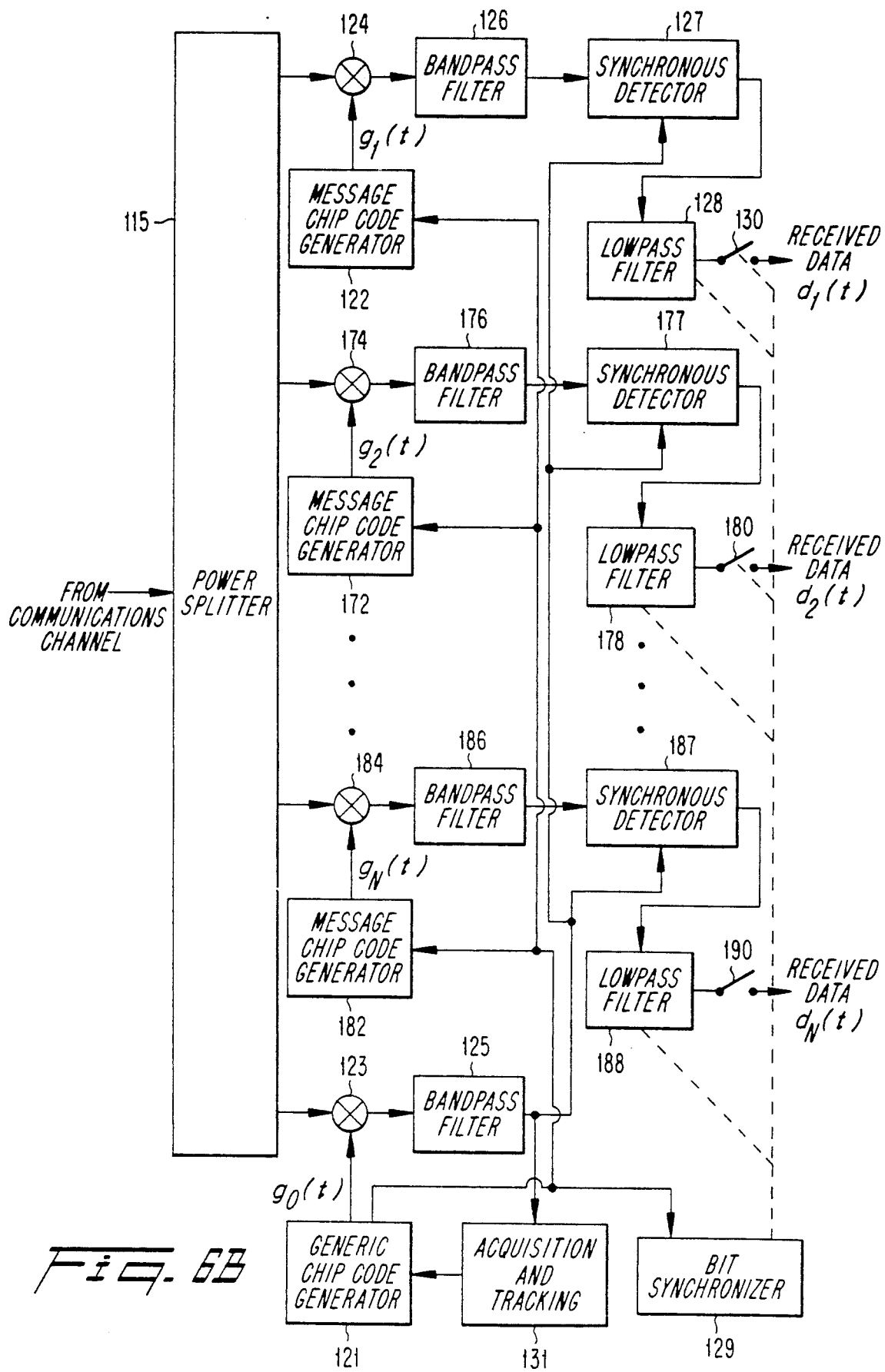
FIG. 6B shows a spread spectrum receiver using a synchronous detector for receiving a plurality of spread-spectrum processed signals.

The present invention includes receiving a spread-spectrum-communications signal which has a plurality of spread-spectrum-processed signals. The receiver further includes a plurality of message-spread-spectrum processing means, a plurality of detection means and a plurality of bit synchronization means. The plurality message-spread-spectrum-processing means, as shown in FIG. 6B, may be embodied as a plurality of message-chip-code generators, a plurality of message mixers and a plurality of message-bandpass filters. A mixer is connected between a respective message-chip-code generator and message-bandpass filter. The plurality of message mixers is coupled to the power splitter 115. More particularly, the plurality of message-chip-code generators is shown embodied as first message-chip-code generator 122, second message-chip-code generator 172, through $N^{th}$ message-chip-code generator 182. The plurality of message mixers is shown as first message mixer 124, second message mixer 174 through $N^{th}$ message mixer 184. The plurality of message-bandpass filters is shown as first message-bandpass filter 126, second message-bandpass filter 176, through $N^{th}$ message-bandpass filter 186.

The plurality of detection means may be embodied as a plurality of synchronous detectors which is shown as first synchronous detector 127, second synchronous detector 177 through $N^{th}$ synchronous detector 187. Each of the plurality of synchronous detectors are coupled to one of the plurality message-bandpass filters.

The plurality of bit-synchronization means may include a bit synchronizer 129, a plurality of lowpass filters and a plurality of electronic switches. The plurality of lowpass filters is shown as first lowpass filter 128, second lowpass filter 178, through $N^{th}$ lowpass filter 188. The plurality of electronic switches is shown as first electronic switch 130, second electronic switch 180 through $N^{th}$ electronic switch 190. Each of the plurality of synchronous detectors is coupled to an output of the generic-bandpass filter 125. The recovered-carrier signal from the generic-bandpass filter 125 serves as the reference signal for synchronously demodulating each of the plurality of message-data signals by the plurality of synchronous detectors, as a plurality of received data, $d_1(t), d_2(t) \ldots d_N(t)$.

Figure 6C:
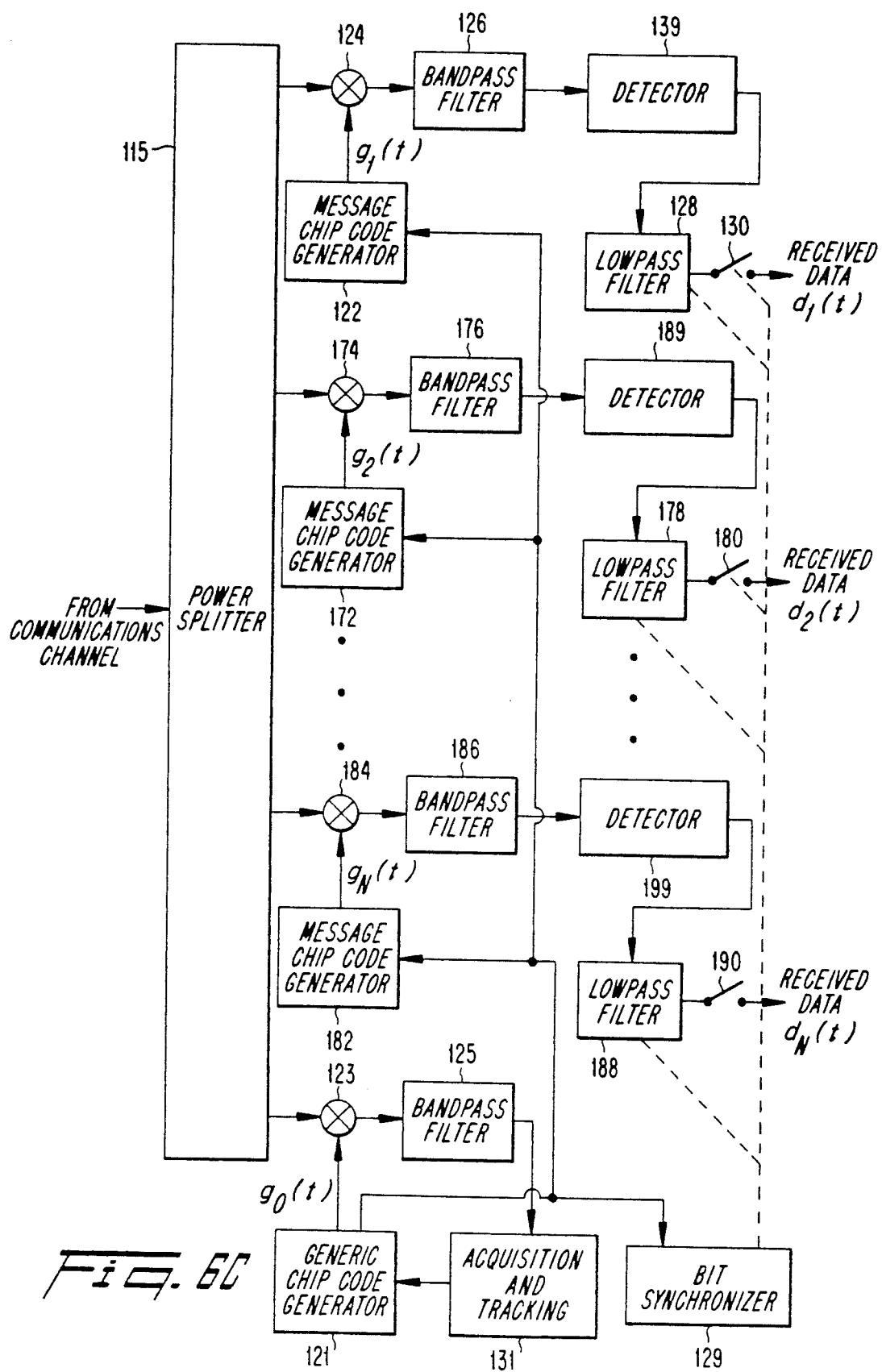
FIG. 6C shows a spread spectrum receiver using a nonsynchronous detector for receiving a plurality of spread-spectrum processed signals.

The detection means alternatively may be embodied as a plurality of nonsynchronous detectors, such as envelope detectors 139, 189, 199, as shown in FIG. 6C. Typically, the nonsynchronous detectors do not require the recovered-carrier signal.

The bit synchronizer 129 derives timing from the replica of the generic-chip-code signal, $g_0(t)$, and controls the timing of the integrating and dumping functions of the plurality lowpass filters and the plurality of electronic switches.

With the use of the invention as embodied in FIG. 6B, a generic-spread-spectrum channel, as part of the spread-spectrum-communications signal, provides the recovered-carrier signal, as discussed previously. The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131. The receiver-generic-chip-code generator 121 generates a replica of the generates a replica of the generic-chip-code signal, $g_0(t)$, which provides timing to bit synchronizer 129 and to the plurality of receiver-message-chip-code generators 122, 172, 182.

The present invention also includes a method for synchronously demodulating a spread-spectrum-communications signal. Message data are input to the spreading means. Referring to FIG. 7, the method comprises the steps of generating 403 a generic-chip-code signal. The method further includes generating 405 message data synchronized to the generic-chip-code signal, and generating 407 a message-chip-code signal synchronized to the generic-chip-code signal. Message data are processed, using a spread-spectrum modulator, with the message-chip-code signal to generate a spread-spectrum-processed signal. The generic-chip-code signal is combined 409 with the spread-spectrum-processed signal. The method transmits 411 the combined generic-chip-code signal and spread-spectrum-processed signal on a carrier signal over the communications channel as a spread-spectrum-communications signal.

At a receiver, the method includes recovering 413 the carrier signal from the spread-spectrum-communications signal and despreading 415 the spread-spectrum-communications signal as a modulated-data signal. The recovered-carrier signal is used to synchronize the step of despreading the spread-spectrum-communications signal and to optionally synchronously demodulate 417 and output 419 the modulated-data signal as received data.

In use, the transmitter-generic-chip-code generator 101 generates the generic-chip-code signal, $g_0(t)$. Message data are spread-spectrum processed by the EXCLUSIVE-OR device 103 with message-chip-code signal, $f_1(t)$, from transmitter-message-chip-code generator 102. The combiner 105 combines the generic-chip-code signal with the spread-spectrum-processed signal. The combined signal may be, for example, a multilevel signal, which is generated by linearly adding the voltage levels of the generic-chip-code signal and the spread-spectrum-processed signal, or by adding the voltage levels of the generic-chip-code signal with a plurality of spread-spectrum-processed signals. The transmitter transmits on a carrier signal having a carrier frequency, $f_o$, the combined generic-chip-code signal and the plurality of spread-spectrum-processed signals. The spread-spectrum-communications signal is transmitted through the communications channel 110.

At the receiver, the generic-spread-spectrum-processing means, embodied as the receiver-generic-chip-code generator 121, the generic mixer 123 and the generic-bandpass filter 125, cooperatively operate to recover the carrier signal from the spread-spectrum-communications signal. The message-spread-spectrum-processing means, embodied as the receiver-message-chip-code generator 122, the message mixer 124 and the message-bandpass filter 126, cooperatively despread the spread-spectrum-communications signal as the modulated-data signal. The receiver-message-chip-code generator 122 preferably is synchronized to the replica of the generic-chip-code signal from the receiver-generic-chip-code generator 121. A plurality of receiver-message-chip-code generators may be employed, synchronized to the replica of the generic-chip-code signal. The detection means, embodied as the synchronous detector 127 synchronized to the recovered-carrier signal, demodulates the modulated-data signal as received data.

The received data are integrated and dumped by lowpass filter 128 and electronic switch 130, under control of the bit synchronizer 129. The bit synchronizer 129 preferably uses the replica of the generic-chip-code signal for synchronizing the integrate and dump functions.

The present invention also includes a method for a synchronously modulating and demodulating a duopoly, triopoly, or polyopoly of spread spectrum communications signals. The method comprises the steps of generating a first generic-chip-code signal and a first message-chip-code signal. The first message data are modulo-2 added to the first message-chip-code signal to generate a first spread-spectrum-processed signal. The first generic-chip-code signal, if used, and the first spread-spectrum-processed signal are combined and transmitted on a first carrier signal over the communications channel as a first spread-spectrum-communications signal.

The method comprises the steps of generating a second generic-chip-code signal and a second message-chip-code signal. The second message data are modulo-2 added to the second message-chip-code signal to generate a second spread-spectrum-processed signal. The second generic-chip-code signal, if used, and the second spread-spectrum-processed signal are combined and transmitted on a second carrier signal at a second carrier frequency which is offset from the first carrier frequency by the chip rate, over the communications channel as a second spread-spectrum-communications signal.

For a triopoly, the method comprises the steps of generating a third generic-chip-code signal and a third message-chip-code signal. The third message data are modulo-2 added to the third message-chip-code signal to generate a third spread-spectrum-processed signal.

The third generic-chip-code signal, if used, and the third spread-spectrum-processed signal are combined and transmitted on a third carrier signal at a third carrier frequency which is offset from the first carrier frequency by twice the chip rate, over the communications channel as a third spread-spectrum-communications signal.

At the first receiver station, the steps include recovering the first carrier signal from the first spread-spectrum-communications signal and despreading the first spread-spectrum-communications signal as a first modulated-data signal. The first recovered-carrier signal is used to synchronize the step of generating a replica of the first generic-chip-code signal. More particularly, a replica of the first generic-chip-code signal is correlated with the first spread-spectrum-communications signal, which has a first generic channel defined by the first generic-chip-code signal at the transmitter. If the signal out of the first generic-bandpass filter is small, then the first acquisition and tracking circuit delays the phase of the first generic-chip-code signal and the correlation process is repeated. If the phase of the replica of the first generic-chip-code signal and the first generic-chip-code signal in the first spread-spectrum-communications signal are the same, then the output of the first generic-bandpass filter will be at a high voltage level.

A replica of the first message-chip-code signal is synchronized to the replica of the first generic-chip-code signal for despreading the first spread-spectrum-communications signal as a first modulated-data signal. The first modulated-data signal is detected as a detected signal. The first recovered-carrier signal optionally may be used to synchronously demodulate the first modulated-data signal as the first detected signal. The first detected signal is synchronously converted to first received data, by using timing from the replica of the first generic-chip-code signal to control "integrating and dumping" functions of a first lowpass filter and first electronic switch.

At the second receiver station, the steps include recovering the second carrier signal from the second spread-spectrum-communications signal and despreading the second spread-spectrum-communications signal as a second modulated-data signal. The second recovered-carrier signal is used to synchronize the step of generating a replica of the second generic-chip-code signal. More particularly, a replica of the second generic-chip-code signal is correlated with the second spread-spectrum-communications signal, which has a second generic channel defined by the second generic-chip-code signal at the transmitter. If the signal out of the second generic-bandpass filter is small, then the second acquisition and tracking circuit delays the phase of the second generic-chip-code signal and the correlation process is repeated. If the phase of the replica of the second generic-chip-code signal and the second generic-chip-code signal in the second spread-spectrum-communications signal are the same, then the output of the second generic-bandpass filter will be at a high voltage level.

A replica of the second message-chip-code signal is synchronized to the replica of the second generic-chip-code signal for despreading the second spread-spectrum-communications signal as a second modulated-data signal. The second modulated-data signal is detected as a detected signal. The second recovered-carrier signal optionally may be used to synchronously demodulate the second modulated-data signal as the second detected signal. The second detected signal is synchronously converted to second received data, by using timing from the replica of the second generic-chip-code signal to control "integrating and dumping" functions of a second lowpass filter and second electronic switch.

At the third receiver station, the steps include recovering the third carrier signal from the third spread-spectrum-communications signal and despreading the third spread-spectrum-communications signal as a third modulated-data signal. The third recovered-carrier signal is used to synchronize the step of generating a replica of the third generic-chip-code signal. More particularly, a replica of the third generic-chip-code signal is correlated with the third spread-spectrum-communications signal, which has a third generic channel defined by the third generic-chip-code signal at the transmitter. If the signal out of the third generic-bandpass filter is small, then the third acquisition and tracking circuit delays the phase of the third generic-chip-code signal and the correlation process is repeated. If the phase of the replica of the third generic-chip-code signal and the third generic-chip-code signal in the third spread-spectrum-communications signal are the same, then the output of the third generic-bandpass filter will be at a high voltage level.

A replica of the third message-chip-code signal is synchronized to the replica of the third generic-chip-code signal for despreading the third spread-spectrum-communications signal as a third modulated-data signal. The third modulated-data signal is detected as a detected signal. The third recovered-carrier signal optionally may be used to synchronously demodulate the third modulated-data signal as the third detected signal. The third detected signal is synchronously converted to third received data, by using timing from the replica of the third generic-chip-code signal to control "integrating and dumping" functions of a third lowpass filter and third electronic switch.

The present invention may include further the steps using a first transmitter station, a second transmitter station, and optionally a third transmitter station, with each transmitter station generating a plurality of message-chip-code signals. A plurality of message data is modulo-2 added to the plurality of message-chip-code signals, to generate a plurality of spread-spectrum-processed signals, respectively. The generic-chip-code signal and the plurality of spread-spectrum-processed signals are combined and transmitted on a carrier signal over the communications channel as the spread-spectrum-communications signal. The carrier signal of the second transmitter station is shifted in frequency from the carrier signal of the first transmitter station by the chip rate used in the message chip code signals. The carrier signal of the third transmitter station is shifted in frequency from the carrier signal of the first transmitter station by twice the chip rate used in the message-chip-code signals. The plurality of message data and the plurality of message-chip-code signals preferably have synchronous timing to the generic-chip-code signal.

When the spread-spectrum-communications signal includes a plurality of spread-spectrum-processed signals, the present invention may further include the steps, using a first receiver station, a second receiver station and optionally a third receiver station with each receiver station despreading the spread-spectrum-communications signal as a plurality of modulated-data signals. The carrier signal of the second transmitter station is shifted in frequency from the carrier signal of the first transmitter station by the chip rate of the message-chip-code signals. The carrier signal of the third transmitter station is shifted in frequency from the carrier signal of the first transmitter station by twice the chip rate of the message-chip-code signals. The recovered-carrier signal is used to synchronize the step of generating a replica of the generic-chip-code signal. A replica of the plurality of message-chip-code signals is synchronized to the replica of the generic-chip-code signal, for despreading the spread-spectrum-communications signal as a plurality of modulated-data signals. The plurality of modulated-data signals is detected as a plurality of received signals, which is converted to a plurality of detected data.

As with the system of the present invention, generating and using generic-chip-code signals is optional with any of the transmitter stations and receiver stations. Also, the method may be extended to a polyopoly with each spread spectrum system shifted in frequency progressively by the chip rate, and the chip rate is adjusted so that the combined bandwidth of the multiplicity of spread spectrum signals remains within an allocated bandwidth.

PERFORMANCE OF THE INVENTION

In examining the performance of the invention, consider a received signal, r(t), which includes a generic chip code signal and message data spread-spectrum processed by a message-chip-code signal and modulated by a first carrier signal at a first carrier frequency, $w_o$, and a second spread spectrum signal modulated at a second carrier frequency, $w_o + w_c$, and a third spread spectrum signal modulated at a third carrier frequency, $w_o - w_c$. The signal may be represented as follows:

$$r(t) = g(t)\cos(w_0 t + \Theta_0) + d_1(t)g_1(t)\cos(w_0 t + \Theta_1) +$$
$$d_2(t)g_2(t)\cos((w_0 + w_c)t + \Theta_2) + d_3(t)g_3(t)\cos((w_0 - w_c)t + \Theta_3)$$

For coherent detection, the estimated data, d, can be found by integrating the received signal, r(t), multiplied by the message-chip-code signal and a first carrier signal at a first carrier frequency. This may be expressed as follows:

$$d = \int_0^{T_b} r(t)g(t)\cos(w_0 t + \Phi)dt$$

The noise from the other terms, n, is expressed by the following equation:

$$n = \frac{1}{2}\int_0^{T_b} d_1(t)g(t)g_1(t)\cos\Theta_1 dt +$$
$$\frac{1}{2}\int_0^{T_b} d_2(t)g(t)g_2(t)\cos(w_c t + \Theta_2)dt +$$
$$\frac{1}{2}\int_0^{T_b} 3(t)g(t)g_3(t)\cos(w_c t + \Theta_3)dt$$

The variance, $\sigma_n^2$ can be expressed as follows:

$$\sigma_n^2 = \int_{-T_b}^{T_b} d(T_b - |\tau|)R_g^2(\tau)[1 + 2\cos(w_c\tau)]d\tau$$

The following shows that the power ratio between the variances of two signals having different chip codewords is $\cos(w_c\tau)17$.

$$P = \frac{\sigma_{n1}^2}{\sigma_{n2}^2} = \frac{2\int_{-T_b}^{T_b}(T_b - |\tau|)R_g^2(\tau)\cos(w_c\tau)d\tau}{\int_{-T_b}^{T_b}(T_b - |\tau|)R_g^2(\tau)d\tau}$$

In the receiver, the intended received signal is despread and there are remaining in the spread spectrum out of the receiver, interference from signals in the band. There also will be interference from signals which are not in the adjacent bands. The amount of interference from each of the two possible adjacent bands is 15%.

Consider a monopoly spread spectrum system. After despreading a signal, the signal-to-noise ratio (SNR) is as follows:

$$SNR_1 = \frac{P_s}{P_I} \cdot \frac{f_{c1}}{f_b}$$

If the monopoly spread spectrum has $M_1$ users then the signal-to-noise ratio equals:

$$SNR_1 = \frac{1}{M_1 - 1} \cdot \frac{f_{c1}}{f_b}$$

For a duopoly spread spectrum system having a total bandwidth of 140 MHz, with the spread spectrum signals having a chip rate of 23 megachips which yield a bandwidth of 46 MHz, the signal-to-noise ratio is given as follows:

$$SNR_2 = \frac{P_s}{P_I} \cdot \frac{f_{c2}}{f_b}$$

Note that the power of the interference, $P_I$ is as follows:

$$P_I = (M_2 - 1)P_s = 0.115(M_2 - 1)P_s$$

Thus, the signal-to-noise ratio for the duopoly is given as $$SNR_2 = \frac{.833}{M_2 - 1} \cdot \frac{f_{c1}}{f_{c2}}$$

For the triopoly the signal-to-noise ratio for a total bandwidth of 140 MHz, and a chip rate $f_{c3} = 20$ megachips per second, yielding a bandwidth of 40 MHz, the signal-to-noise ratio is given as follows:

$$SNR_3 = \frac{P_s}{P_I} \cdot \frac{f_{c3}}{f_b}$$

and the power of the interference, $P_I$ is as follows:

$$P_I = 1.23(M_3 - 1)P_s$$

Thus, the signal-to-noise ratio for the triopoly is given as:

$$SNR_3 = \frac{0.678}{(M_3 - 1)} \cdot \frac{f_{c1}}{f_b}$$

For a quatropoly having a total bandwidth of 140 MHz, and a chip rate of $f_{c4}=15$ megachips per second yielding a bandwidth of $f_b=30$ MHz, the signal-to-ratio is given by:

$$SNR_4 = \frac{P_s}{P_I} \cdot \frac{f_{c4}}{f_b}$$

and the power of the interference, $P_I$ is as follows:

$$P_I = 1.23(M_4 - 1)P_s$$

Thus, the signal-to-noise ratio for the quatropoly is given as:

$$SNR_3 = \frac{0.508}{(M_4 - 1)} \cdot \frac{f_{c1}}{f_b}$$

Assuming that each of the systems, the monopoly, duopoly, triopoly and quatropoly spread spectrum systems each operate at the same signal-to-noise ratio to achieve the same performance quality, then we have the following equality:

$$SNR_1 = SNR_2 = SNR_3 = SNR_4$$
$$M_2 = 0.83 M_1$$
$$M_3 = 0.6 M_1$$
$$M_4 = 0.44 M_1$$

The following table gives a comparison of the performance between the monopoly, duopoly, triopoly and quatropoly:

| System | Users/Channel | Total No. of Users in System |
| --- | --- | --- |
| 1 | $M_1$ | $M_1$ |
| 2 | $0.83 M_1$ | $1.66 M_1$ |
| 3 | $0.6 M_1$ | $2.04 M_1$ |
| 4 | $0.44 M_1$ | $2.04 M_1$ |

Note that the quatropoly spread spectrum system yields approximately the same number of users as the triopoly spread spectrum system but has decreased immunity to multipath fading since the bandwidth is substantially less.

It will be apparent to those skilled in the art that various modifications can be made to the polyopoly overlapping spread-spectrum communications system and method of the instant invention without departing from the scope or spirit of the invention, and it is intended that the present invention cover modifications and variations of the polyopoly overlapping spread-spectrum communications system and method provided they come in the scope of the appended claims and their equivalents.

What is claimed is:

1. A spread spectrum communications system for use over a communications channel, comprising:

a first transmitter-generic-chip-code generator for generating a first generic-chip-code signal having a chip rate;

a first transmitter-message-chip-code generator for generating a first message-chip-code signal having the chip rate;

a first EXCLUSIVE-OR gate coupled to said first transmitter-message-chip-code generator for spread-spectrum processing first message data with the first message-chip-code signal to generate a first spread-spectrum signal;

a first combiner coupled to said first transmitter-generic-chip-code generator and said first EXCLUSIVE-OR gate for combining the first generic-chip-code signal with the first spread-spectrum-processed signal;

a first transmitter coupled to said first combiner for transmitting the combined first generic-chip-code signal and first spread-spectrum-processed signal, on a first carrier signal at a first carrier frequency over said communications channel as a first spread-spectrum-communications signal;

a second transmitter-generic-chip-code generator for generating a second generic-chip-code signal having the chip rate;

a second transmitter-message-chip-code generator for generating a second message-chip-code signal having the chip rate;

a second EXCLUSIVE-OR gate coupled to said second transmitter-message-chip-code generator for spread-spectrum processing second message data with the second message-chip-code signal to generate a second spread-spectrum signal;

a second combiner coupled to said second transmitter-generic-chip-code generator and said second EXCLUSIVE-OR gate for combining the second generic-chip-code signal with the second spread-spectrum-processed signal;

a second transmitter coupled to said second combiner for transmitting the combined second generic-chip-code signal and second spread-spectrum-processed signal, on a second carrier signal at a second carrier frequency offset from the first carrier frequency by the chip rate, over said communications channel as a second spread-spectrum-communications signal;

a first receiver-generic-chip-code generator for generating a replica of the first generic-chip-code signal;

a first generic mixer coupled to said first receiver-generic-chip-code generator for recovering the first carrier signal from the first spread-spectrum-communications signal as a first recovered-carrier signal;

a first receiver-message-chip-code generator coupled to said first receiver-generic-chip-code signal for generating a replica of the first message-chip-code signal;

a first message mixer coupled to said first receiver-message-chip-code generator responsive to the replica of the first message-chip-code signal for despreading the first spread-spectrum-communications signal as a first modulated-data signal;

a first message-bandpass filter coupled to said first receiver-message-mixer device for filtering the first modulated-data signal;

a first-generic-bandpass filter coupled to said first generic-mixer device for filtering the first recovered-carrier signal recovered from the first spread-spectrum-communications signal;

a first tracking and acquisition circuit coupled to an output of said first generic-bandpass filter and to said first receiver-generic-chip-code generator, said first tracking and acquisition circuit responsive to acquiring and tracking the first recovered-carrier signal for synchronizing the first generic-chip-code signal to the first recovered-carrier signal;

a first power splitter coupled between said communications channel, said first generic-mixer device and said first receiver-message-mixer device for dividing the first spread-spectrum-communications signal between said first generic-mixer device and said first receiver-message-mixer device;

a first synchronous detector coupled to said first message-bandpass filter and said first generic-bandpass filter, responsive to the first recovered-carrier signal recovered by the first generic-mixer device for synchronously demodulating the first modulated-data signal as a first detected signal;

a second receiver-generic-chip-code generator for generating a replica of the second generic-chip-code signal;

a second generic mixer coupled to said second receiver-generic-chip-code generator for recovering the second carrier signal from the second spread-spectrum-communications signal as a second recovered-carrier signal;

a second receiver-message-chip-code generator coupled to said second receiver-generic-chip-code signal and synchronized to the replica of the second generic-chip-code signal for generating a replica of the second message-chip-code signal;

a second message mixer coupled to said second receiver-message-chip-code generator responsive to the replica of the second message-chip-code signal for despreading the second spread-spectrum-communications signal as a second modulated-data signal;

a second message-bandpass filter coupled to said second receiver-message-mixer device for filtering the second modulated-data signal;

a second-generic-bandpass filter coupled to said second generic-mixer device for filtering the second recovered-carrier signal recovered from the second spread-spectrum-communications signal;

a second tracking and acquisition circuit coupled to an output of said second generic-bandpass filter and to said second receiver-generic-chip-code generator, said second tracking and acquisition circuit responsive to acquiring and tracking the second recovered-carrier signal for synchronizing the second generic-chip-code signal to the second recovered-carrier signal;

a second power splitter coupled between said communications channel, said second generic-mixer device and said second receiver-message-mixer device for dividing the second spread-spectrum-communications signal between said second generic-mixer device and said second receiver-message-mixer device; and a second synchronous detector coupled to said second message-bandpass filter and said second generic-bandpass filter, responsive to the second recovered-carrier signal recovered by the second generic-mixer device for synchronously demodulating the second modulated-data signal as a second detected signal.

2. A spread spectrum communications system for use over a communications channel comprising:

first message means for generating a first message-chip-code signal having a chip rate;

first spreading means for spread-spectrum processing first message data with the first message-chip-code signal to generate a first spread-spectrum-processed signal;

first means for transmitting the first spread-spectrum-processed signal on a first carrier signal at a first carrier frequency over said communications channel as a first spread-spectrum-communications signal;

second message means for generating a second message-chip-code signal having the chip rate;

second spreading means for spread-spectrum processing second message data with the second message-chip-code signal to generate a second spread-spectrum-processed signal;

second means for transmitting the second spread-spectrum-processed signal on a second carrier signal at a second carrier frequency offset from the first carrier frequency by the chip rate over said communications channel as a second spread-spectrum-communications signal;

first message-spread-spectrum-processing means for despreading the first spread-spectrum-communications signal as a first modulated-data signal;

first detection means for detecting the first modulated-data signal as a first detected signal;

first bit-synchronization means for synchronously converting the first detected signal as first received data;

second message-spread-spectrum-processing means for despreading the second spread-spectrum-communications signal as a second modulated-data signal;

second detection means for detecting the second modulated-data signal as a second detected signal; and second bit-synchronization means responsive to the second generic-chip-code signal for synchronously converting the second detected signal as second received data.

3. The spread spectrum communications system as set forth in claim 2 further including:

at least third message means for generating a third message-chip-code signal having the chip rate;

at least third spreading means for spread-spectrum processing third message data with the third message-chip-code signal to generate a third spread-spectrum-processing signal;

at least third means for transmitting the third spread-spectrum-processed signal on a third carrier signal at a third carrier frequency offset from the first carrier frequency by twice the chip rate over said communications channel as a third spread-spectrum-communications signal;

at least third message-spread-spectrum-processing means for despreading the third spread-spectrum-communications signal as a third modulated-data signal;

at least third detection means for detecting the third modulated-data signal as a third detected signal; and at least third bit-synchronization means responsive to the third generic-chip-code signal for synchronously converting the third detected signal as third received data.

4. The spread spectrum communications system as set forth in claim 2 further including:
 first generic means for generating a first generic-chip-code signal;
 first summer means for combining the first generic-chip-code signal with the first spread-spectrum-processed signal;
 said first transmitting means transmits the combined first generic-chip-code signal and first spread-spectrum-processed signal;
 first generic-spread-spectrum-processing means for recovering the first carrier signal from the first spread-spectrum-communications signal as a first recovered-carrier signal and for generating a replica of the first generic-chip-code signal;
 first acquisition means responsive to acquiring and tracking the first recovered-carrier signal for synchronizing said first generic-spread-spectrum-processing means to the first recovered-carrier signal; and
 wherein said first bit-synchronization means is responsive to the first generic-chip-code signal for synchronously converting the first detected signal as first received data.

5. The spread spectrum communications system as set forth in claim 4 wherein each of said first and second detection means includes an envelope detector for converting the first and second modulated-data signals to the first and second detected signals, respectively.

6. The spread spectrum communications system as set forth in claim 4 further including:
 second generic means for generating a second generic-chip-code signal;
 second summer means for combining the second generic-chip-code signal with the second spread-spectrum-processed signal;
 said second transmitting means transmits the combined second generic-chip-code signal and second spread-spectrum-processed signal;
 second generic-spread-spectrum-processing means for recovering the second carrier signal from the second spread-spectrum-communications signal as a second recovered-carrier signal and for generating a replica of the second generic-chip-code signal;
 second acquisition means responsive to acquiring and tracking the second recovered-carrier signal for synchronizing said second generic-spread-spectrum-processing means to the second recovered-carrier signal; and
 wherein said second bit-synchronization means is responsive to the second generic-chip-code signal for synchronously converting the second detected signal as second received data.

7. The spread spectrum communications system as set forth in claim 6 wherein each of said first and second detection means includes a synchronous detector responsive to the first and second recovered-carrier signal, respectively, for converting the first and second modulated-data signals to the first and second detected signals, respectively.

8. The spread spectrum communications system as set forth in claim 6 wherein each of said first and second bit-synchronization means further includes:
 a lowpass filter;
 an electronic switch coupled at an output of said lowpass filter; and
 a bit-synchronizer coupled to said first and second generic-spread-spectrum-processing means, respectively, and responsive to the replica of the first and second generic-chip-code signals, respectively, for integrating and dumping said lowpass filter and said electronic switch, respectively.

9. The spread spectrum communications system as set forth in claim 2 wherein each of said first and second bit-synchronization means further includes:
 a lowpass filter;
 an electronic switch coupled at an output of said lowpass filter; and
 a bit-synchronizer responsive to the first and second received data at an input to said lowpass filter for integrating and dumping said lowpass filter and said electronic switch, respectively.

10. A method for synchronously demodulating spread spectrum communications, comprising the steps of:
 generating a first message-chip-code signal having a chip rate;
 spread-spectrum processing first message data with the first message-chip-code signal to generate a first spread-spectrum-processed signal;
 transmitting the first spread-spectrum-processed signal on a first carrier signal at a first carrier frequency over said communications channel as a first spread-spectrum-communications signal;
 generating a second message-chip-code signal having the chip rate;
 spread-spectrum processing second message data with the second message-chip-code signal to generate a second spread-spectrum-processed signal;
 transmitting the second spread-spectrum-processed signal on a second carrier signal at a second carrier frequency offset from the first carrier frequency by the chip rate over said communications channel as a second spread-spectrum-communications signal;
 generating a replica of the first message-chip-code signal synchronized to the replica of the first generic-chip-code signal;
 despreading, using the replica of the first message-chip-code signal, the first spread-spectrum-communication signal as a first modulated-data signal;
 demodulating the first modulated-data signal as first received data;
 generating a replica of the second message-chip-code signal synchronized to the replica of the second generic-chip-code signal;
 despreading, using the replica of the second message-chip-code signal, the second spread-spectrum-communications signal as a second modulated-data signal; and
 demodulating the second modulated-data signal as second received data.

11. The method as set forth in claim 10 further including the steps of:
 generating at least third message-chip-code signal having the chip rate;
 spread-spectrum processing at least third message data with the at least third message-chip-code signal to generate at least third spread-spectrum-processed signal;
 transmitting the at least third spread-spectrum-processed signal on at least third carrier signal at a respective at least third carrier frequency offset from the first carrier frequency by the chip rate over said communications channel as at least third spread-spectrum-communications signal;

generating a replica of the at least third message-chip-code signal synchronized to the replica of the at least third generic-chip-code signal;

despreading, using the replica of the at least third message-chip-code signal, the at least third spread-spectrum-communications signal as at least third modulated-data signal; and demodulating the at least third modulated-data signal as at least third received data.

12. The method as set forth in claim 11 further including the steps of:

recovering, using a replica of a first generic-chip-code signal, the first carrier signal from the first spread-spectrum-communications signal as a first recovered-carrier signal;

acquiring and tracking the first recovered-carrier signal;

generating the replica of the first generic-chip-code signal synchronized to the first recovered-carrier signal; and synchronizing the replica of the first generic-chip-code signal to the first recovered-carrier signal.

13. The method as set forth in claim 10 further including the steps of:

recovering, using a replica of a first generic-chip-code signal, the first carrier signal from the first spread-spectrum-communications signal as a first recovered-carrier signal;

acquiring and tracking the first recovered-carrier signal;

generating the replica of the first generic-chip-code signal synchronized to the first recovered-carrier signal;

recovering, using a replica of the second generic-chip-code signal, the second carrier signal from the second spread-spectrum-communications signal as a second recovered-carrier signal;

acquiring and tracking the second recovered-carrier signal;

generating the replica of the second generic-chip-code signal synchronized to the second recovered-carrier signal;

synchronizing the replica of the first generic-chip-code signal to the first recovered-carrier signal; and synchronizing the replica of the second generic-chip-code signal to the second recovered-carrier signal.

14. The method as set forth in claim 13 wherein each demodulating step includes synchronously demodulating, using the first and second recovered-carrier signals, respectively, the first and second modulated-data signals, respectively, as first and second detected signals, respectively.

15. The method as set forth in claim 13 further including the steps of:

generating at least third message-chip-code signal having the chip rate;

spread-spectrum processing at least third message data with the at least third message-chip-code signal to generate at least third spread-spectrum-processed signal;

transmitting the at least third spread-spectrum-processed signal on at least third carrier signal at a respective at least third carrier frequency offset from the first carrier frequency by the chip rate over said communications channel as at least third spread-spectrum-communications signal;

generating a replica of the at least third message-chip-code signal synchronized to the replica of the at least third generic-chip-code signal;

despreading, using the replica of the at least third message-chip-code signal, the at least third spread-spectrum-communications signal as at least third modulated-data signal; and demodulating the at least third modulated-data signal as at least third received data.

16. The method as set forth in claim 15 further including the steps of:

recovering, using a replica of at least third generic-chip-code signal, the at least third carrier signal from the at least third spread-spectrum-communications signal as at least third recovered-carrier signal, respectively;

acquiring and tracking the at least third recovered-carrier signal;

generating the replica of the first generic-chip-code signal synchronized to the first recovered-carrier signal; and synchronizing the replica of the at least third generic-chip-code signal to the at least third recovered-carrier signal.

17. The method as set forth in claim 16 wherein each demodulating step includes synchronously demodulating, using the first, second, and at least third recovered-carrier signals, respectively, the first, second, and at least third modulated-data signals, respectively, as first, second, and at least third detected signals, respectively.

18. A spread spectrum communication system for use over a communications channel, comprising:

first generic means for generating a first generic-chip-code signal;

a first plurality of message means for generating a first plurality of message-chip-code signals;

a first plurality of spreading means for spread-spectrum processing the first plurality of message data with the first plurality of message-chip-code signals to generate a first plurality of spread-spectrum-processed signals;

first summer means for combining the first generic-chip-code signal with the first plurality of spread-spectrum-processed signals;

first means for transmitting the combined first generic-chip-code signal and the first plurality of spread-spectrum-processed signals, on a first carrier signal at a first carrier frequency over said communications channel as a first spread-spectrum-communications signal;

second generic means for generating a second generic-chip-code signal;

a second plurality of message means for generating a second plurality of message-chip-code signals;

a second plurality of spreading means for spread-spectrum processing the second plurality of message data with the second plurality of message-chip-code signals to generate a second plurality of spread-spectrum-processed signals;

second summer means for combining the second generic-chip-code signal with the second plurality of spread-spectrum-processed signals;

second means for transmitting the combined second generic-chip-code signal and the second plurality of spread-spectrum-processed signals, on a second carrier signal at a second carrier frequency over said communications channel as a second spread-spectrum-communications signal;

first generic-spread-spectrum-processing means for recovering the first carrier signal from the first spread-spectrum-communications signal as a first recovered-carrier signal, and for generating a replica of the first generic-chip-code signal;

first acquisition means responsive to acquiring and tracking the first recovered-carrier signal for synchronizing said first generic-spread-spectrum-processing means to the first recovered-carrier signal;

a first plurality of message-spread-spectrum-processing means synchronized to the replica of the first generic-chip-code signal for despreading the first spread-spectrum-communications signal as a first plurality of modulated-data signals;

a first plurality of detection means for detecting the first plurality of modulated-data signals as a first plurality of detected signals;

second generic-spread-spectrum-processing means for recovering the second carrier signal from the second spread-spectrum-communications signal as a second recovered-carrier signal, and for generating a replica of the second generic-chip-code signal;

second acquisition means responsive to acquiring and tracking the second recovered-carrier signal for synchronizing said second generic-spread-spectrum-processing means to the second recovered-carrier signal;

a second plurality of message-spread-spectrum-processing means synchronized to the replica of the second generic-chip-code signal for despreading the second spread-spectrum-communications signal as a second plurality of modulated-data signals; and a second plurality of detection means of detecting the second plurality of modulated-data signals as a second plurality of detected signals.

19. The spread spectrum communications system as set forth in claim 18 further comprising:

first bit-synchronization means responsive to the first generic-chip-code signal for synchronously converting the first plurality of detected signals as first received data;

second bit-synchronization means responsive to the second generic-chip-code signal for synchronously converting the second plurality of detected signals as second received data.

20. The spread spectrum communications system as set forth in claim 19 wherein each of said first and second bit-synchronization means further includes:

a lowpass filter;

an electronic switch coupled at an output of said lowpass filter; and a bit-synchronizer responsive to the first and second received data at an input to said lowpass filter for integrating and dumping said lowpass filter and said electronic switch, respectively.

21. The spread spectrum communications system as set forth in claim 19 wherein each of said first and second bit-synchronization means further includes:

a lowpass filter;

an electronic switch coupled at an output of said lowpass filter; and a bit-synchronizer coupled to said first and second generic-spread-spectrum-processing means, respectively, and responsive to the replica of the first and second generic-chip-code signals, respectively, for integrating and dumping said lowpass filter and said electronic switch, respectively.

22. The spread spectrum communications system as set forth in claim 18 further comprising:

at least third generic means for generating at least third generic-chip-code signal;

at least third plurality of message means for generating at least third plurality of message-chip-code signals;

at least third plurality of spreading means for spread-spectrum processing said at least third plurality of message data with the at least third plurality of message-chip-code signals to generate at least third plurality of spread-spectrum-processed signals;

at least third summer means for combining the at least third generic-chip-code signal and the at least third plurality of spread-spectrum-processed signals;

at least third means for transmitting the combined at least third generic-chip-code signal and the at least third plurality of spread-spectrum-processed signals, on at least third carrier signal at a respective at least third carrier frequency over said communications channel as at least third spread-spectrum-communications signal;

at least third generic-spread-spectrum-processing means for recovering the at least third carrier signal from the at least third spread-spectrum-communications signal as at least third recovered-carrier signal, and for generating, respectively, a replica of the at least third generic-chip-code signal;

at least third acquisition means responsive to acquiring and tracking the at least third recovered-carrier signal for synchronizing said at least third generic-spread-spectrum-processing means to the at least third recovered-carrier signal;

at least third plurality of message-spread-spectrum-processing means synchronized, respectively, to the replica of the at least third generic-chip-code signal for despreading the at least third spread-spectrum-communications signal as at least third plurality of modulated-data signals; and at least third plurality of detection means for detecting the at least third plurality of modulated-data signals as at least third plurality of detected signals.

23. The spread spectrum communications system as set forth in claim 22 wherein each of said first, second, and at least third plurality of detection means includes a synchronous detector responsive to the first, second and at least third recovered-carrier signal, respectively, for converting the first, second, and at least third plurality of modulated-data signals, respectively, to the first, second, and at least third plurality of detected signals, respectively.

24. The spread spectrum communications system as set forth in claim 22 wherein each of said first, second, and at least third plurality of detection means includes an envelope detector for converting the first, second, and at least third plurality of modulated-data signals, respectively, to the first, second, and at least third plurality of detected signals, respectively.

25. The spread spectrum communications system as set forth in claim 22 further comprising:

at least third bit-synchronization means responsive to the at least third generic-chip-code signal for synchronously converting the at least third plurality of detected signals as at least third received data.

26. The spread spectrum communications system as set forth in claim 25 wherein each of said first, second, and at least third bit-synchronization means further includes:
- a lowpass filter;
- an electronic switch coupled at an output of said lowpass filter; and
- a bit-synchronizer responsive to the first, second, and at least third received data at an input to said lowpass filter for integrating and dumping said lowpass filter and said electronic switch, respectively.

27. The spread spectrum communications system as set forth in claim 25 wherein each of said first, second and at least third bit-synchronization means further includes:
- a lowpass filter;
- an electronic switch coupled at an output of said lowpass filter; and
- a bit-synchronizer coupled to said first, second, and at least third generic-spread-spectrum-processing means, respectively, and responsive to the replica of the first, second, and at least third generic-chip-code signals, respectively, for integrating and dumping said lowpass filter and said electronic switch, respectively.

28. The spread spectrum communications system as set forth in claim 18 wherein each of said first plurality of detection means and each of said second plurality of detection means includes an envelope detector for converting the first plurality of modulated-data signals and the second plurality of modulated-data signals to the first plurality of detected signals and the second plurality of detected signals, respectively.

29. The spread spectrum communications system as set forth in claim 18 wherein each of said first plurality of detection means and each of said second plurality of detection means includes a synchronous detector responsive to the first and second recovered-carrier signal, respectively, for converting the first and second plurality of modulated-data signals, respectively, to the first and second plurality of detected signals, respectively.

* * * * *